US012325249B2

(12) United States Patent
Tanaka et al.

(10) Patent No.: US 12,325,249 B2
(45) Date of Patent: Jun. 10, 2025

(54) MEDICINE PACKAGING DEVICE, INK RIBBON RUNNING CONTROL METHOD, INK RIBBON ROLL AND INK RIBBON CASSETTE

(71) Applicant: YUYAMA MFG. CO., LTD., Osaka (JP)

(72) Inventors: Tooru Tanaka, Osaka (JP); Tomohiro Sugimoto, Osaka (JP); Satoru Ogino, Osaka (JP); Noboru Yamazaki, Osaka (JP); Tomonari Oda, Osaka (JP)

(73) Assignee: Yuyama Mfg. Co., Ltd., Osaka (JP)

(*) Notice: Subject to any disclaimer, the term of this patent is extended or adjusted under 35 U.S.C. 154(b) by 240 days.

(21) Appl. No.: 18/303,518

(22) Filed: Apr. 19, 2023

(65) Prior Publication Data

US 2023/0249486 A1 Aug. 10, 2023

Related U.S. Application Data

(63) Continuation of application No. 17/063,587, filed on Oct. 5, 2020, now Pat. No. 11,660,894, which is a (Continued)

(30) Foreign Application Priority Data

Mar. 5, 2012 (JP) ................................ 2012-048607
Aug. 30, 2012 (JP) ................................ 2012-189757

(51) Int. Cl.
*B41J 32/00* (2006.01)
*B41J 17/02* (2006.01)
(Continued)

(52) U.S. Cl.
CPC ............... *B41J 32/00* (2013.01); *B41J 17/02* (2013.01); *B41J 17/24* (2013.01); *B41J 17/32* (2013.01);
(Continued)

(58) Field of Classification Search
CPC ... B41J 32/00; B41J 17/02; B41J 17/24; B41J 17/32; B41J 17/36; B41J 33/14; B41J 31/00; B65B 61/025
(Continued)

(56) References Cited

U.S. PATENT DOCUMENTS 5,248,208 A 9/1993 Yoshida et al.
5,976,675 A 11/1999 Yamano et al.
(Continued)

FOREIGN PATENT DOCUMENTS

CN 101035683 A 9/2007
JP 58002152 A 1/1983
(Continued)

OTHER PUBLICATIONS

Japanese Patent Office, Office Action dated Feb. 8, 2022 with English translation in Japanese Patent Application No. JP2021-074599, 5 pages.

*Primary Examiner* — Jason S Uhlenhake
*Assistant Examiner* — Alexander D Shenderov
(74) *Attorney, Agent, or Firm* — Masuvalley & Partners

(57) ABSTRACT

Provided is a medicine packaging device. The medicine packaging device includes: a reader-writer that reads information from an IC tag installed at a supply core of an ink ribbon roll detachably installed to an ink ribbon cassette as well as writes information to the IC tag; a motor control unit that controls a winding motor for rotating a winding core, based on a used length of the ink ribbon which is information read from the IC tag, so that the ink ribbon of the ink ribbon roll runs in a winding direction at a higher speed than a feeding speed of a continuous sheet for packaging; and a written information output unit that outputs information showing the used length of the ink ribbon which has been
(Continued)

changed due to use of the ink ribbon, to the reader/writer as information written on the IC tag.

1 Claim, 15 Drawing Sheets

Related U.S. Application Data continuation of application No. 15/366,227, filed on Dec. 1, 2016, now Pat. No. 10,836,192, which is a continuation of application No. 14/382,743, filed as application No. PCT/JP2013/055489 on Feb. 28, 2013, now Pat. No. 9,539,834.

(51) Int. Cl.

| | |
|---|---|
| ***B41J 17/24*** | (2006.01) |
| ***B41J 17/32*** | (2006.01) |
| ***B41J 17/36*** | (2006.01) |
| ***B41J 33/14*** | (2006.01) |
| ***B65B 61/02*** | (2006.01) |

(52) U.S. Cl.
CPC ............... *B41J 17/36* (2013.01); *B41J 33/14* (2013.01); *B65B 61/025* (2013.01)

(58) Field of Classification Search
USPC .......................................................... 347/213
See application file for complete search history.

(56) References Cited

U.S. PATENT DOCUMENTS

| | | | | |
|---|---|---|---|---|
| 6,292,207 | B1 | 9/2001 | Sogabe | |
| 6,386,772 | B1 | 5/2002 | Klinefelter et al. | |
| 2001/0046399 | A1 | 11/2001 | Hayashi | |
| 2003/0077098 | A1* | 4/2003 | Nunokawa | B41J 15/04 400/582 |
| 2004/0084512 | A1 | 5/2004 | Inamura | |
| 2006/0102774 | A1 | 5/2006 | Quick et al. | |
| 2006/0152537 | A1* | 7/2006 | Iwamoto | B41L 13/04 347/7 |
| 2007/0081844 | A1* | 4/2007 | Lee | B41J 17/32 400/208 |
| 2008/0029530 | A1 | 2/2008 | Yuyama et al. | |

FOREIGN PATENT DOCUMENTS

| | | | |
|---|---|---|---|
| JP | S63290787 | A | 11/1988 |
| JP | 01-262169 | A | 10/1989 |
| JP | H04-179559 | A | 6/1992 |
| JP | 05-221106 | A | 8/1993 |
| JP | H07-017099 | A | 1/1995 |
| JP | 07-089106 | A | 4/1995 |
| JP | H08-058209 | A | 3/1996 |
| JP | H08-072372 | A | 3/1996 |
| JP | H09-278292 | A | 10/1997 |
| JP | H11-034451 | A | 2/1999 |
| JP | 2000-052629 | A | 2/2000 |
| JP | 2000-203541 | A | 7/2000 |
| JP | 2002-052794 | A | 5/2003 |
| JP | 2003-127488 | A | 5/2003 |
| JP | 2003-154719 | A | 5/2003 |
| JP | 2003-312111 | A | 11/2003 |
| JP | 2004-114612 | A | 4/2004 |
| JP | 2004-243725 | A | 9/2004 |
| JP | 2004-276243 | A | 10/2004 |
| JP | 2004-284206 | A | 10/2004 |
| JP | 2004-299283 | A | 10/2004 |
| JP | 2005-199582 | A | 7/2005 |
| JP | 2006-130307 | A | 5/2006 |
| JP | 2007-502765 | A | 2/2007 |
| JP | 2008-024504 | A | 2/2008 |
| JP | 2008-137318 | A | 6/2008 |
| JP | 4564437 | B | 10/2010 |
| JP | 2011-056803 | A | 3/2011 |
| JP | 2012-076357 | A | 9/2012 |
| JP | 6344504 | B2 | 6/2018 |

* cited by examiner

MEDICINE PACKAGING DEVICE, INK RIBBON RUNNING CONTROL METHOD, INK RIBBON ROLL AND INK RIBBON CASSETTE

RELATED APPLICATIONS

This application is a continuation of and claims priority to U.S. patent application Ser. No. 17/063,587 filed Oct. 5, 2020 entitled Medicine Packaging Device, Ink Ribbon Running Control Method, Ink Ribbon Roll and Ink Ribbon Cassette, which is a continuation of and claims priority to U.S. patent application Ser. No. 15/366,227 filed Dec. 1, 2016 entitled Medicine Packaging Device, Ink Ribbon Running Control Method, Ink Ribbon Roll and Ink Ribbon Cassette (now U.S. Pat. No. 10,836,192 issued Nov. 17, 2020), which is a continuation of and claims priority to U.S. patent application Ser. No. 14/382,743 filed Sep. 3, 2014 entitled Medicine Packaging Device, Ink Ribbon Running Control Method, Ink Ribbon Roll and Ink Ribbon Cassette (now U.S. Pat. No. 9,539,834 issued Jan. 10, 2017), which is a U.S. National Phase application under 35 U.S.C. § 371 of International Application No. PCT/JP2013/055489 filed on Feb. 28, 2013, entitled Medicine Packaging Device, Ink Ribbon Running Control Method, Ink Ribbon Roll and Ink Ribbon Cassette, which claims priority under 35 U.S.C. § 119 to Japanese Application No. 2012-048607 filed on Mar. 5, 2012, and Japanese Application No. 2012-189757 filed on Aug. 30, 2012, all of which are hereby incorporated herein by reference in their entireties.

FIELD OF INVENTION

The present invention relates to a medicine packaging device that can perform printing on a continuous sheet for packaging as well as package medicine by one package through the use of the continuous sheet for packaging, an ink ribbon running control method, an ink ribbon roll, and an ink ribbon cassette for an ink ribbon roll used in the above printing.

BACKGROUND OF INVENTION

As a medicine packaging device that prints patient names and the dates for taking medicine, etc. on a continuous sheet for packaging, as well as package medicine such as tablets or powder medicine, etc. by one package by using the continuous sheet for packaging, a medicine dispensing apparatus disclosed in a publication of Japanese patent No. 4564437 is known.

In the medicine dispensing device, the continuous sheet for packaging for packaging medicine is supplied from a roll, the continuous sheet for packaging and an ink ribbon are overlapped with a position of a print head, and printing of a name of a patient, a dosage time, etc. is performed through the print head. In a state where an opening of the continuous sheet for packaging to which printing was performed as stated above is faced upward and the continuous sheet for packaging is folded in half, medicine such a tablet and powdered medicine is packaged by one package.

The ink ribbon comes in contact with the continuous sheet for packaging, and run along with the continuous sheet for packaging. The ink ribbon is separated from the continuous sheet for packaging after the printing by the printing head. When a slack occurs in the ink ribbon which is to be separated, the ink ribbon is separated vertically from the continuous sheet for packaging. Therefore, there is a possibility that printing failure may occur. For this reason, the ink ribbon is passed over a tension bar which is arranged in a running path of the ink ribbon so that the ink ribbon is separated obliquely from the continuous sheet for packaging, thereby preventing defective printing. The tension bar is rotatably provided as well as is biased towards one direction by a spring. When the ink ribbon is loosened on the running path, a biasing force of the spring rotates the tension bar to ensure constant tension. Then, when the tension bar is rotated to a predetermined position, a sensor detects this, and a motor for rotating a winding portion which winds the ink ribbon is activated to wind the ink ribbon. Once the ink ribbon is wound in this manner, the tension bar is pressed by the ink ribbon, and the tension bar rotates the opposite way against the biasing force of the spring.

SUMMARY OF INVENTION

Technical Problem

However, in the conventional structure described above, because an operation where the ink ribbon is properly passed over the tension bar when the ink ribbon is attached to the medicine packaging apparatus is required, the conventional structure is inconvenient for users. In addition, in the conventional structure, because winding of the ink ribbon is performed intermittently in response to a periodic swing of the tension bar, there is a possibility that printing quality may be degraded.

Furthermore, the tension bar is supported by the medicine packaging device in a cantilevered manner. When the tension bar is supported in a cantilevered manner, there is a possibility that an axial direction of the tension bar may sometimes deviate slightly from an orthogonal direction to a packaging sheet transfer direction. When this deviation occurs, it becomes impossible to apply uniform tension on the packaging sheet, thereby degrading the printing quality. Although the above mentioned deviation may be solved by supporting the tension bar with both ends, this results in difficulty for the packaging sheet to pass over the tension bar.

In view of the circumstances above, the present invention provides a medicine packaging device and an ink ribbon running control method, where the tension bar for applying tension to the ink ribbon is not required. Furthermore, the present invention also provides an ink ribbon roll which is useful for this medicine packaging device, and an ink ribbon cassette to which the ink ribbon roll is detachably installed.

In order to solve the above problem, the present invention provides a medicine packaging device printing on a continuous sheet for packaging by bringing an ink ribbon and the continuous sheet for packaging into contact with one another using a print head, as well as packaging medicine by one package by using the continuous sheet for packaging, the medicine packaging device including:

- a reader-writer that reads information from a recording medium installed at a supply core or a winding core of a ink ribbon roll as well as writes information to the recording medium;
- a rotation speed control unit that controls a winding motor so as to be $V_1>V_2$, where a running speed of the ink ribbon of the ink ribbon roll in the direction of winding is $V_1$, and a feed speed of the continuous sheet for packaging is $V_2$, based on a usage amount or a remaining amount of the ink ribbon, which are information read from the recording medium, the winding motor rotating a winding side support shaft that supports the winding core;

a torque transmission control unit provided in a driving force transmission path that transmits driving force of the winding motor to the winding side support shaft, for running the ink ribbon with a same speed as the speed V2 at the time of printing when the ink ribbon and the continuous sheet for packaging are in contact with each another; and an information output unit that outputs information showing the usage amount or the remaining amount of the ink ribbon which have been changed due to the use of the ink ribbon, to the reader-writer as information to be written on the recording medium.

Furthermore, the present invention provides a medicine packaging device printing on a continuous sheet for packaging by bringing an ink ribbon and the continuous sheet for packaging into contact with one another using a print head, as well as packaging medicine by one package by using the continuous sheet for packaging, the medicine packaging device including:

an ink ribbon roll that has the ink ribbon wound around a supply core having a structure where an inner tube is inserted into an outer tube, whereby forming a gap between the inner tube and the outer tube, the ink ribbon roll further having a recording medium provided in the gap;

a reader-writer that reads information from the recording medium installed at the supply core of the ink ribbon roll as well as writes information to the recording medium;

a rotation speed control unit that controls a winding motor so as to be V1>V2, where a running speed of the ink ribbon of the ink ribbon roll in the direction of winding is V1, and a feed speed of the continuous sheet for packaging is V2, based on a usage amount or a remaining amount of the ink ribbon, which are information read from the recording medium, the winding motor rotating a winding side support shaft that supports a winding core of the ink ribbon roll;

a torque transmission control unit provided in a driving force transmission path that transmits driving force of the winding motor to the winding side support shaft, for running the ink ribbon with a same speed as the speed V2 at the time of printing when the ink ribbon and the continuous sheet for packaging are in contact with each another; and an information output unit that outputs information showing the usage amount or the remaining amount of the ink ribbon which have been changed due to the use of the ink ribbon, to the reader-writer as information to be written on the recording medium.

Furthermore, the present invention provides a medicine packaging device printing on a continuous sheet for packaging by bringing an ink ribbon and the continuous sheet for packaging into contact with one another using a print head, as well as packaging medicine by one package by using the continuous sheet for packaging, the medicine packaging device including:

an ink ribbon roll that has the ink ribbon wound around a supply core having a structure where an inner tube is inserted into an outer tube, whereby forming a gap between the inner tube and the outer tube, the ink ribbon roll further having a recording medium provided in the gap;

an ink ribbon cassette to which the ink ribbon roll is detachably installed;

a reader-writer that reads information from the recording medium installed at the supply core from a position outside of the ink ribbon cassette as well as writes information to the recording medium;

a rotation speed control unit that controls a winding motor so as to be $V_1>V_2$, where a running speed of the ink ribbon of the ink ribbon roll in the direction of winding is $V_1$, and a feed speed of the continuous sheet for packaging is $V_2$, based on a usage amount or a remaining amount of the ink ribbon, which are information read from the recording medium, the winding motor rotating a winding side support shaft that supports a winding core of the ink ribbon roll;

a torque transmission control unit provided in a driving force transmission path that transmits driving force of the winding motor to the winding side support shaft, for running the ink ribbon with a same speed as the speed V2 at the time of printing when the ink ribbon and the continuous sheet for packaging are in contact with each another; and an information output unit that outputs information showing the usage amount or the remaining amount of the ink ribbon which have been changed due to the use of the ink ribbon, to the reader-writer as information to be written on the recording medium.

With this configuration, information showing the usage amount or the remaining amount of the ink ribbon is read from the recording medium installed at the supply core, etc., Based on such information, the speed V1 is set and the winding motor is thus controlled. By setting the speed V1 in this manner, the ink ribbon may be wound up without slack, without the use of a tension bar. Accordingly, the tension bar for the medicine packaging device is not required, which eliminates the need for the ink ribbon to pass over the tension bar. Furthermore, because the ink ribbon can be wound up at a constant speed rather than in an intermittent fashion, the print quality is thus improved. Moreover, even if the speed V1 is set at a higher rate than the speed $V_2$, because the torque transmission control unit is provided in the drive force transmission pathway, this prevents excessive tension from being applied to the ink ribbon, while the ink ribbon can be made to run at the same speed as the feeding speed $V_2$ of the continuous sheet for packaging during the printing process.

Information regarding a thickness of the ink ribbon and information regarding a diameter of the supply core or the winding core may be present as information to be read from the recording medium, and the information regarding the thickness of the ink ribbon and the information regarding the diameter of the supply core or winding core may be used to calculate a rotation speed of the winding side support shaft to obtain the speed V1.

After pressing the print head against the ink ribbon simultaneously with starting the winding motor, image data may be transferred to the print head after waiting for lapse of a first period.

After transferring image data to the print head, the print head may be separated from the ink ribbon after waiting for lapse of a second period.

After initiating operation of separating the print head from the ink ribbon, the winding motor may be stopped after waiting for lapse of a third period.

Abnormalities concerning a winding of the ink ribbon may be detected by comparing an amount of the ink ribbon supplied from the supply core to an amount of the ink ribbon wound up from the winding core.

Furthermore, the present invention provides a method for controlling ink ribbon running of a medicine packaging device printing on a continuous sheet for packaging by bringing an ink ribbon and the continuous sheet for packaging into contact with one another using a print head, as well as packaging medicine by one package by using the continuous sheet for packaging, the method including:

controlling a winding motor so as to be $V_1>V_2$, where a running speed of the ink ribbon of the ink ribbon roll in the direction of winding is $V_1$, and a feed speed of the continuous sheet for packaging is $V_2$, based on a usage amount or a remaining amount of the ink ribbon, which are information read from the recording medium, the winding motor rotating a winding side support shaft that supports a winding core of the ink ribbon roll; and running the ink ribbon with a same speed as the speed $V_2$ at the time of printing when the ink ribbon and the continuous sheet for packaging are in contact with each another by a torque transmission control unit provided in a driving force transmission path that transmits driving force of the winding motor to the winding side support shaft.

Information regarding a thickness of the ink ribbon and information regarding a diameter of the supply core or the winding core may be present as information to be read from the recording medium, and the information regarding the thickness of the ink ribbon and the information regarding the diameter of the supply core or winding core may be used to calculate a rotation speed of the winding side support shaft to obtain the speed $V_1$.

After pressing the print head against the ink ribbon simultaneously with starting the winding motor, image data may be transferred to the print head after lapse of a first period.

After transferring image data to the print head, the print head may be separated from the ink ribbon after lapse of a second period.

After initiating operation of separating the print head from the ink ribbon, the winding motor is stopped after lapse of a third period.

Abnormalities concerning a winding of the ink ribbon may be detected by comparing an amount of the ink ribbon supplied from the supply core to an amount of the ink ribbon wound up from the winding core.

Furthermore, the present invention provides a medicine packaging device printing on a continuous sheet for packaging by bringing an ink ribbon and the continuous sheet for packaging into contact with one another using a print head, as well as packaging medicine by one package by using the continuous sheet for packaging, the medicine packaging device including:

a reader-writer that reads information from a recording medium installed at a supply core or a winding core of a ink ribbon roll as well as writes information to the recording medium;

a rotation speed control unit that controls a winding motor so as to be $V_1=V_2$ or to approximate $V_1$ to $V_2$, where a running speed of the ink ribbon of the ink ribbon roll in the direction of winding is $V_1$, and a feed speed of the continuous sheet for packaging is $V_2$, based on a usage amount or a remaining amount of the ink ribbon, which are information read from the recording medium, the winding motor rotating a winding side support shaft that supports the winding core;

an information output unit that outputs information showing the usage amount or the remaining amount of the ink ribbon which have been changed due to the use of the ink ribbon, to the reader-writer as information to be written on the recording medium.

Furthermore, the present invention a medicine packaging device printing on a continuous sheet for packaging by bringing an ink ribbon and the continuous sheet for packaging into contact with one another using a print head, as well as packaging medicine by one package by using the continuous sheet for packaging, the medicine packaging device including:

an ink ribbon roll that has the ink ribbon wound around a supply core having a structure where an inner tube is inserted into an outer tube, whereby forming a gap between the inner tube and the outer tube, the ink ribbon roll further having a recording medium provided in the gap;

a reader-writer that reads information from the recording medium installed at the supply core of the ink ribbon roll as well as writes information to the recording medium;

a rotation speed control unit that controls a winding motor so as to be $V_1=V_2$ or to approximate $V_1$ to $V_2$, where a running speed of the ink ribbon of the ink ribbon roll in the direction of winding is $V_1$, and a feed speed of the continuous sheet for packaging is $V_2$, based on a usage amount or a remaining amount of the ink ribbon, which are information read from the recording medium, the winding motor rotating a winding side support shaft that supports the winding core;

an information output unit that outputs information showing the usage amount or the remaining amount of the ink ribbon which have been changed due to the use of the ink ribbon, to the reader-writer as information to be written on the recording medium.

Furthermore, the present invention provides a medicine packaging device printing on a continuous sheet for packaging by bringing an ink ribbon and the continuous sheet for packaging into contact with one another using a print head, as well as packaging medicine by one package by using the continuous sheet for packaging, the medicine packaging device including:

an ink ribbon roll that has the ink ribbon wound around a supply core having a structure where an inner tube is inserted into an outer tube, whereby forming a gap between the inner tube and the outer tube, the ink ribbon roll further having a recording medium provided in the gap;

an ink ribbon cassette to which the ink ribbon roll is detachably installed;

a reader-writer that reads information from the recording medium installed at the supply core from a position outside of the ink ribbon cassette as well as writes information to the recording medium;

a rotation speed control unit that controls a winding motor so as to be $V_1=V_2$ or to approximate $V_1$ to $V_2$, where a running speed of the ink ribbon of the ink ribbon roll in the direction of winding is $V_1$, and a feed speed of the continuous sheet for packaging is $V_2$, based on a usage amount or a remaining amount of the ink ribbon, which are information read from the recording medium, the winding motor rotating a winding side support shaft that supports the winding core;

an information output unit that outputs information showing the usage amount or the remaining amount of the ink ribbon which have been changed due to the use of the ink ribbon, to the reader-writer as information to be written on the recording medium.

In regards to these medicine packaging devices, information regarding a thickness of the ink ribbon and information regarding a diameter of the supply core or the winding core may be present as information to be read from the recording medium, and the information regarding the thickness of the ink ribbon and the information regarding the diameter of the supply core or winding core may be used to calculate a rotation speed of the winding side support shaft to obtain the speed $V_1$.

Furthermore, two tabular antennas may be connected to the reader-writer, wherein the two antennas may be arranged so that a radio wave transmission/reception surface faces a peripheral surface of the supply core and that the directions of the radio wave transmission/reception surfaces intersect.

Furthermore, the present invention provides an ink ribbon roll to be detachably installed to a medicine packaging device which prints on a continuous sheet for packaging as well as packages medicine by one package by using the continuous sheet for packaging, the ink ribbon roll including:

an ink ribbon wound around a supply core having a structure where an inner tube is inserted into an outer tube, whereby forming a gap between the inner tube and the outer tube; and a recording medium adhered to an outer surface of the inner tube.

Furthermore, the present invention provides an ink ribbon cassette to which the ink ribbon roll is to be detachably installed, the ink ribbon cassette including a lid lock unit which has a pair of movable lock operation units provided at a lid for closing an accommodating space which houses the ink ribbon roll, wherein the lid locking unit is covered by a cover unit that exposes only one lock operation unit of the pair of the lock operation units.

With the present invention, the user is no longer required to perform the cumbersome task of passing the ink ribbon over the tension bar. Furthermore, because the ink ribbon is able to wind up with a constant speed, various effects such as improvement of printing quality can be obtained.

BRIEF DESCRIPTIONS OF DRAWINGS

DESCRIPTION OF EMBODIMENTS

An embodiment of the present invention will be described below with reference to the accompanying drawings.

Figure 1:
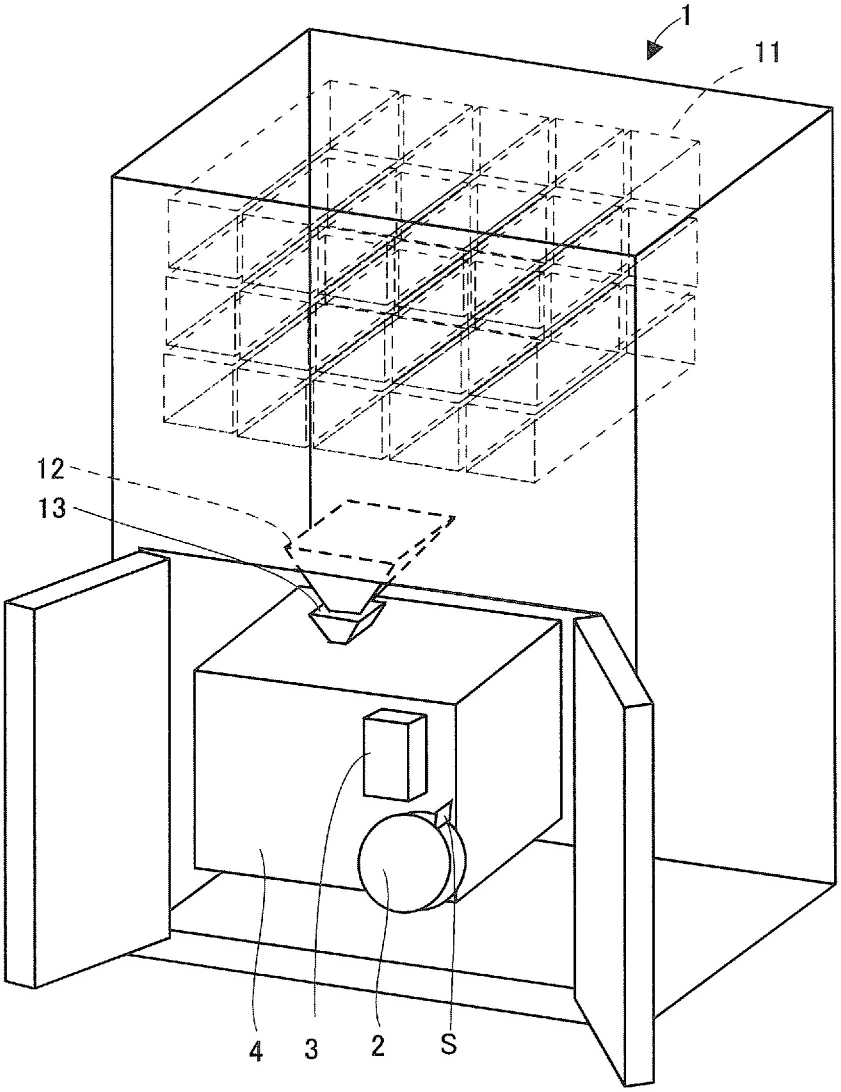
FIG. 1 is a perspective view of a schematic structure of one embodiment of a medicine packaging device.

As shown in FIG. 1, inside a main body of a medicine packaging device 1 according to this embodiment are a medicine housing dispensing unit 11, a hopper group 12 and 13, and a printing and packaging unit 4. The medicine housing and dispensing unit 11 houses medicine by type as well as dispenses the medicine by one package according to a prescription. The hopper group 12 and 13 receives the medicine dispensed by one package. The printing and packaging unit 4, detachably equipped with a roll of continuous sheet for packaging 2 and an ink ribbon cassette 3, prints on a continuous sheet for packaging S that is supplied from the roll of continuous sheet for packaging 2, and packages by one package the medicine that is supplied from the hopper group 12 and 13 by using the continuous sheet for packaging S. The printing and packaging unit 4 is configured to be drawn out from the main body by means of a hinge.

Figure 2:
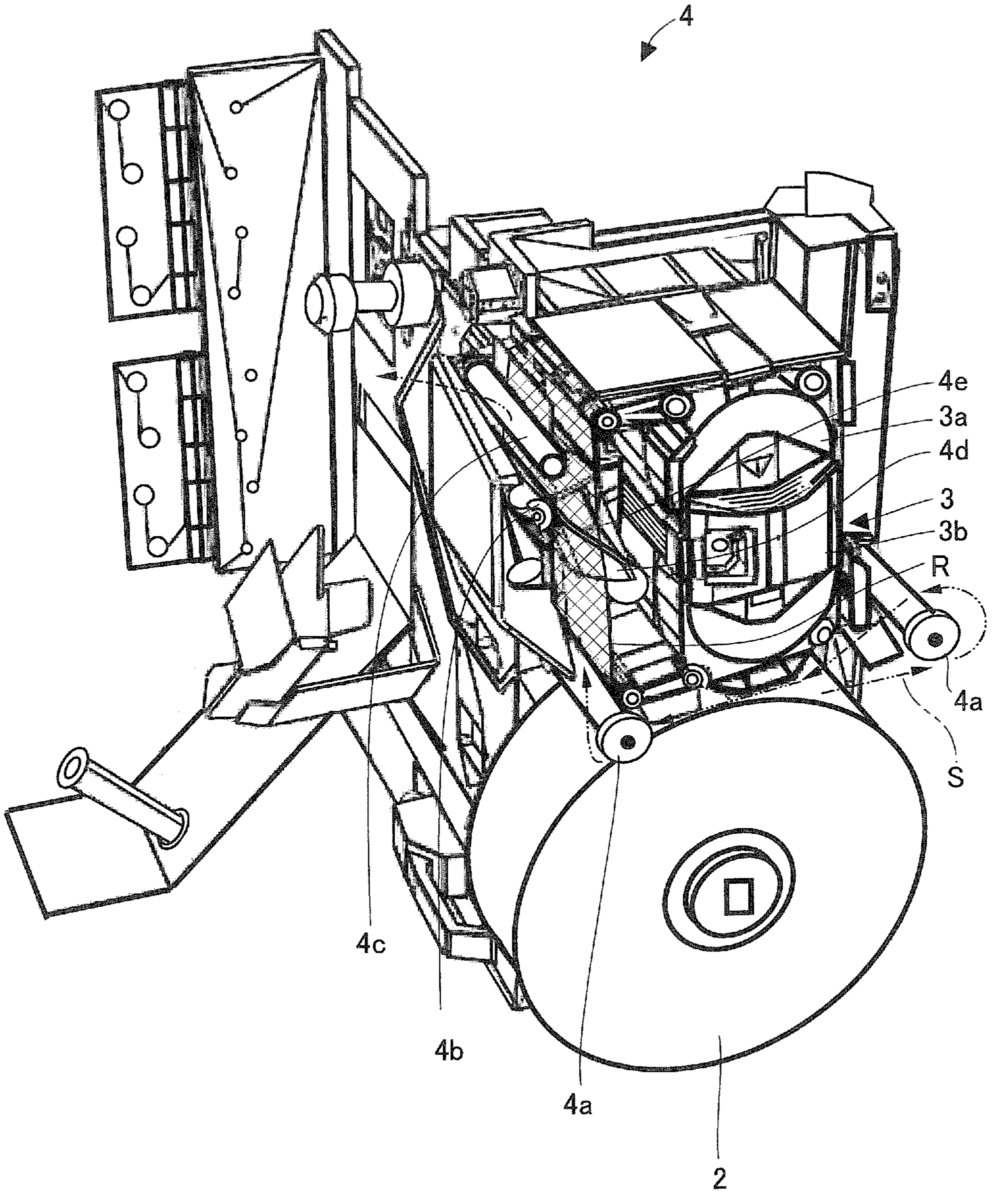
FIG. 2 is a perspective view of a printing and packaging unit provided in the medicine packaging device as shown in FIG. 1.
Figure 5:
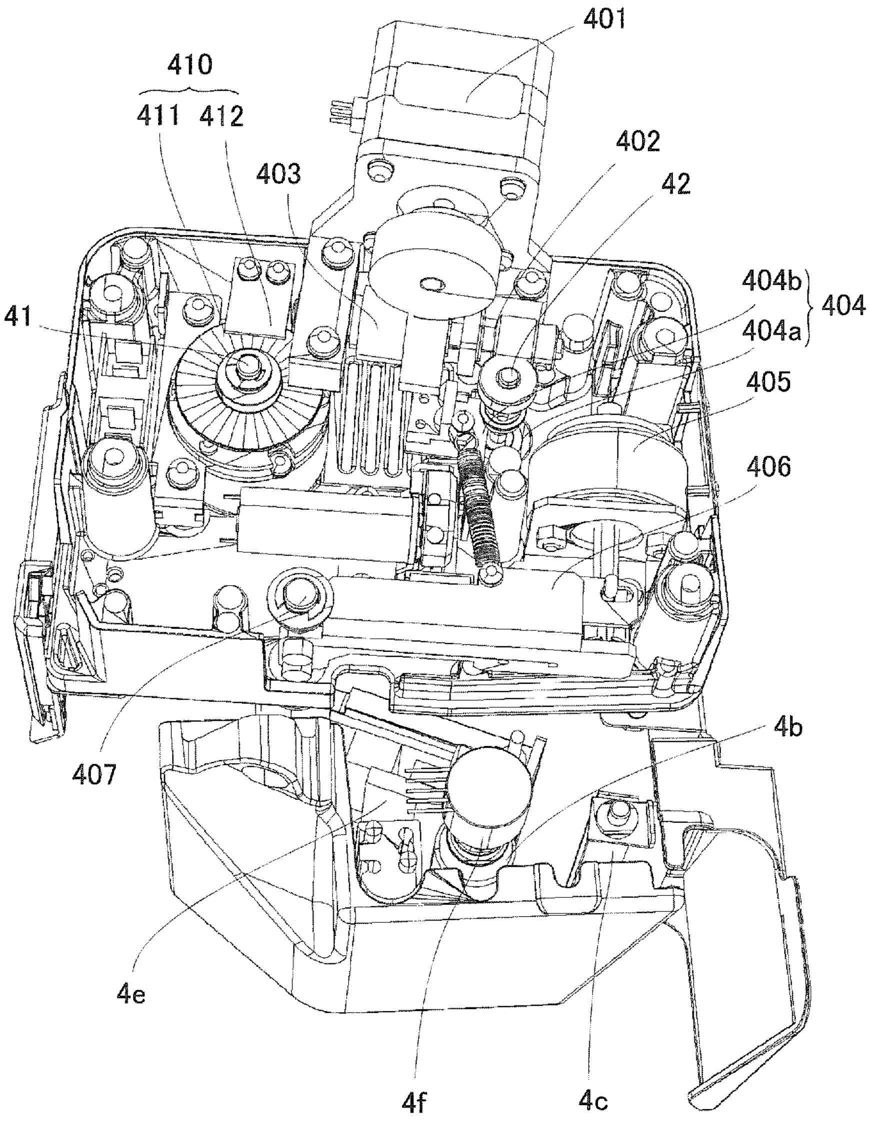
FIG. 5 is a perspective view showing a backside of a printing unit within the printing and packaging unit shown in FIG. 2.
Figure 17:
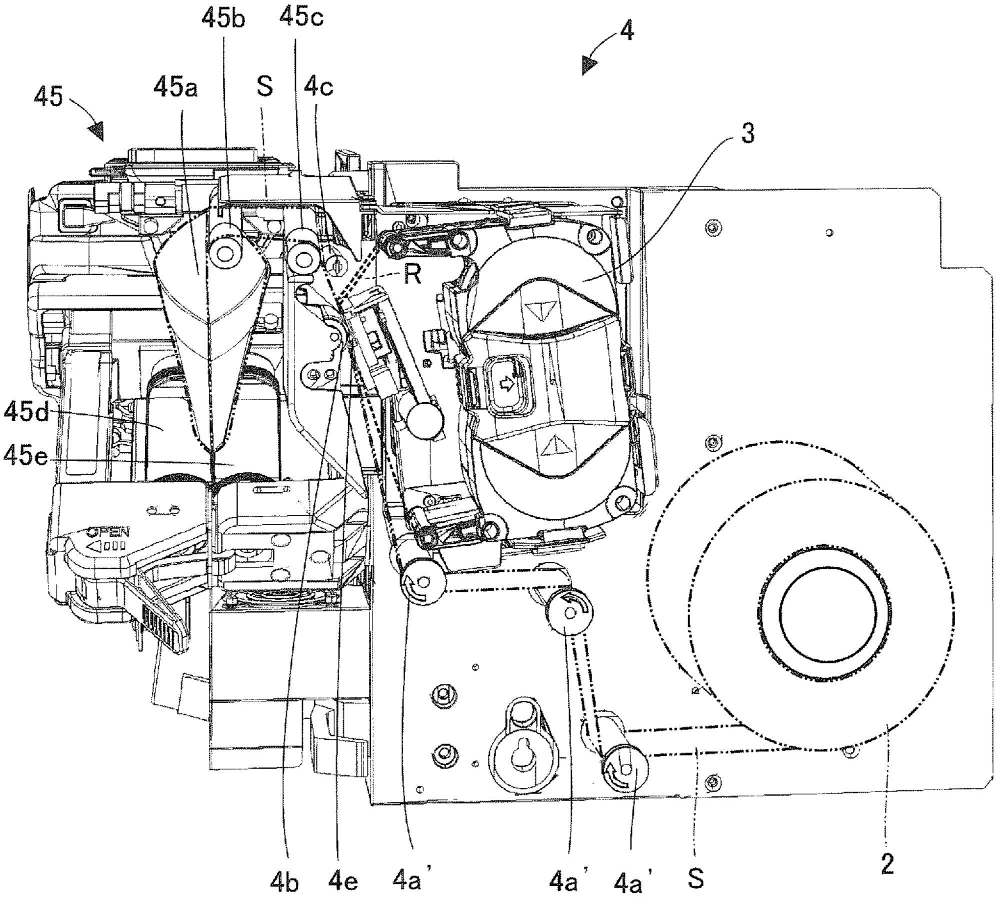
FIG. 17 is a perspective view exemplifying the printing and packaging unit of an embodiment where a position of a roll of a continuous sheet for packaging is different.

FIG. 2 is a perspective view showing the printing and packaging unit 4 with the roll of continuous sheet for packaging 2 and the ink ribbon cassette 3 installed. FIG. 5 is a perspective view of the printing and packaging unit 4 seen from the back side. Furthermore, FIG. 17 is a perspective view showing another configuration of the printing and packaging unit 4, where the position of the roll of continuous sheet for packaging 2 is slightly different. FIG. 17 also shows a packaging unit 45. This packaging unit 45 is an operation unit that introduces medicine from an opening of the continuous sheet for packaging S, and also heat-welds the continuous sheet for packaging S so as to seal the introduced medicine. The continuous sheet for packaging S hooks onto two guide shafts 4*a*' (three guide shafts 4*a*' in FIG. 17), passes through between a backup roller 4*b* and a print head 4*e*, and is passed through to hook onto a guide shaft 4*c*. Further, an ink ribbon R housed within the ink ribbon cassette 3 is guided by a tape guide 4*d* of the printing and packaging unit 4 (see FIG. 2), and passes through between the back-up roller 4*b* and the print head 4*e*. The ink ribbon R is then separated from the continuous sheet for packaging S after printing, and returns inside the ink ribbon cassette 3.

As shown in FIG. 5, a unit where the print head 4*e* is provided is swingably supported around a shaft 407. Specifically, a link component 406 and the print head **4*e* are attached to the shaft 407. When a head solenoid 405 is switched on, a link component 406 is operated and the print head 4*e* rotates around the shaft 407 as its center. Then, the print head 4*e* moves toward a back-up roller 4*b*** side, and presses the ink ribbon R against the continuous sheet for packaging S, readying the printable state.

Further, as shown in FIG. 17, in the vicinity of the guide shaft **4*c* that guides the continuous sheet for packaging S (the downstream side of the conveying direction of the continuous sheet for packaging S), rotatable curved guide rollers 45*b* and 45*c* are arranged to bend the conveying direction of the continuous sheet for packaging S just before an expanding guide 45*a*. A hopper apparatus for introducing the medicine to the continuous sheet for packaging S is provided at the backside of the expanding guide 45*a*. The expanding guide 45*a* expands the twofold continuous sheet for packaging S, and forms an opening for inserting a medicine discharging unit (nozzle) of the hopper apparatus. In addition, the packaging unit 45 includes a pair of heater rollers 45*d* and 45*e* below the expanding guide 45*a*. Furthermore, feeding rollers (not shown in the figures) are provided below the heater rollers 45*d* and 45*e*. These heater roller 45*d* and 45*e* are driven to rotate by a driving mechanism (not shown in the figures) including a motor, direct-acting gear, intermittent gears, etc. The heater rollers 45*d* and 45*e*** enable the continuous sheet for packaging S to run at a feed speed $V_2$, which will be described later.

Figure 3:
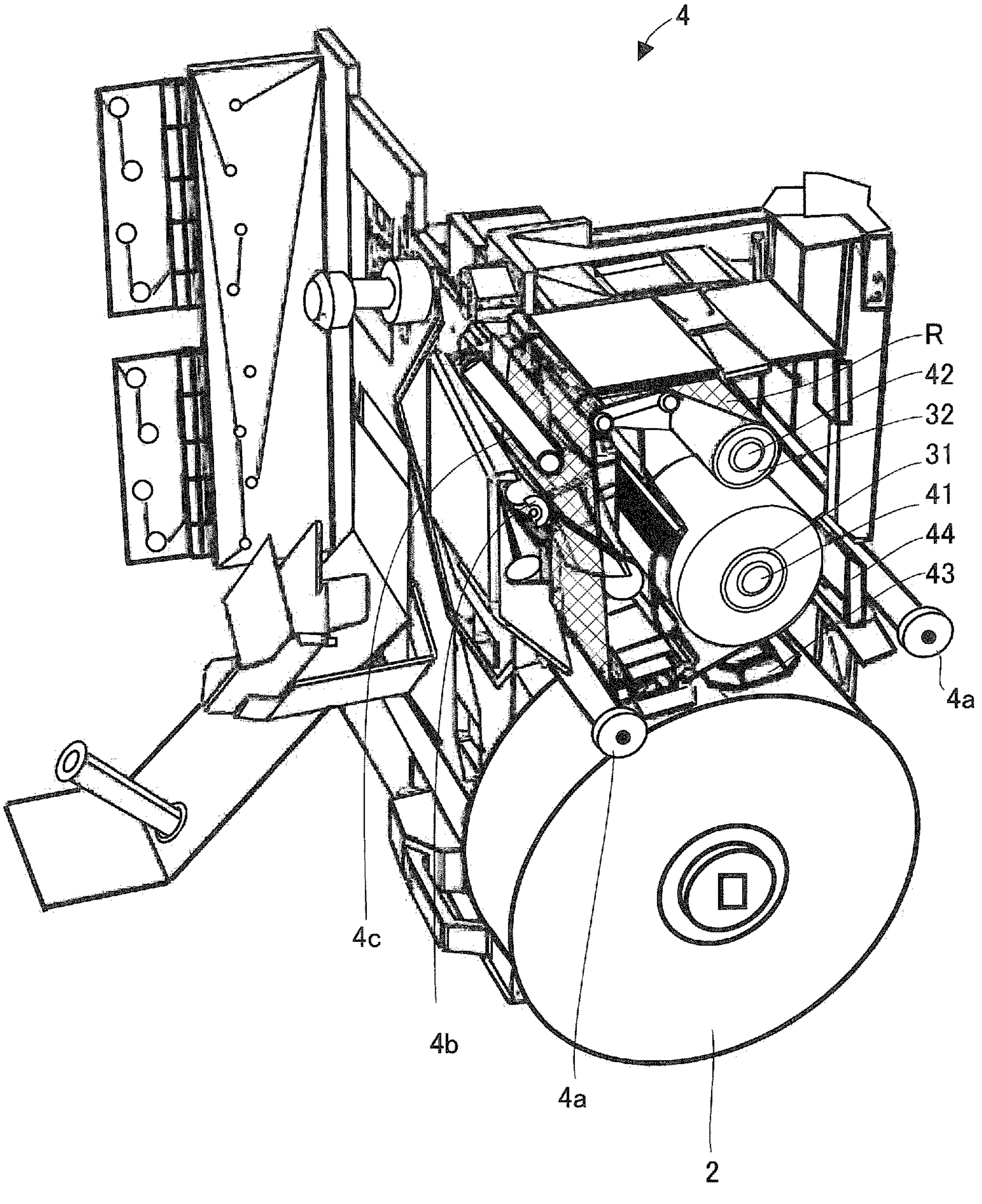
FIG. 3 is a perspective view showing a state where a cover unit, etc., of the ink ribbon cassette is removed in the printing and packaging unit shown in FIG. 2.
Figure 4:
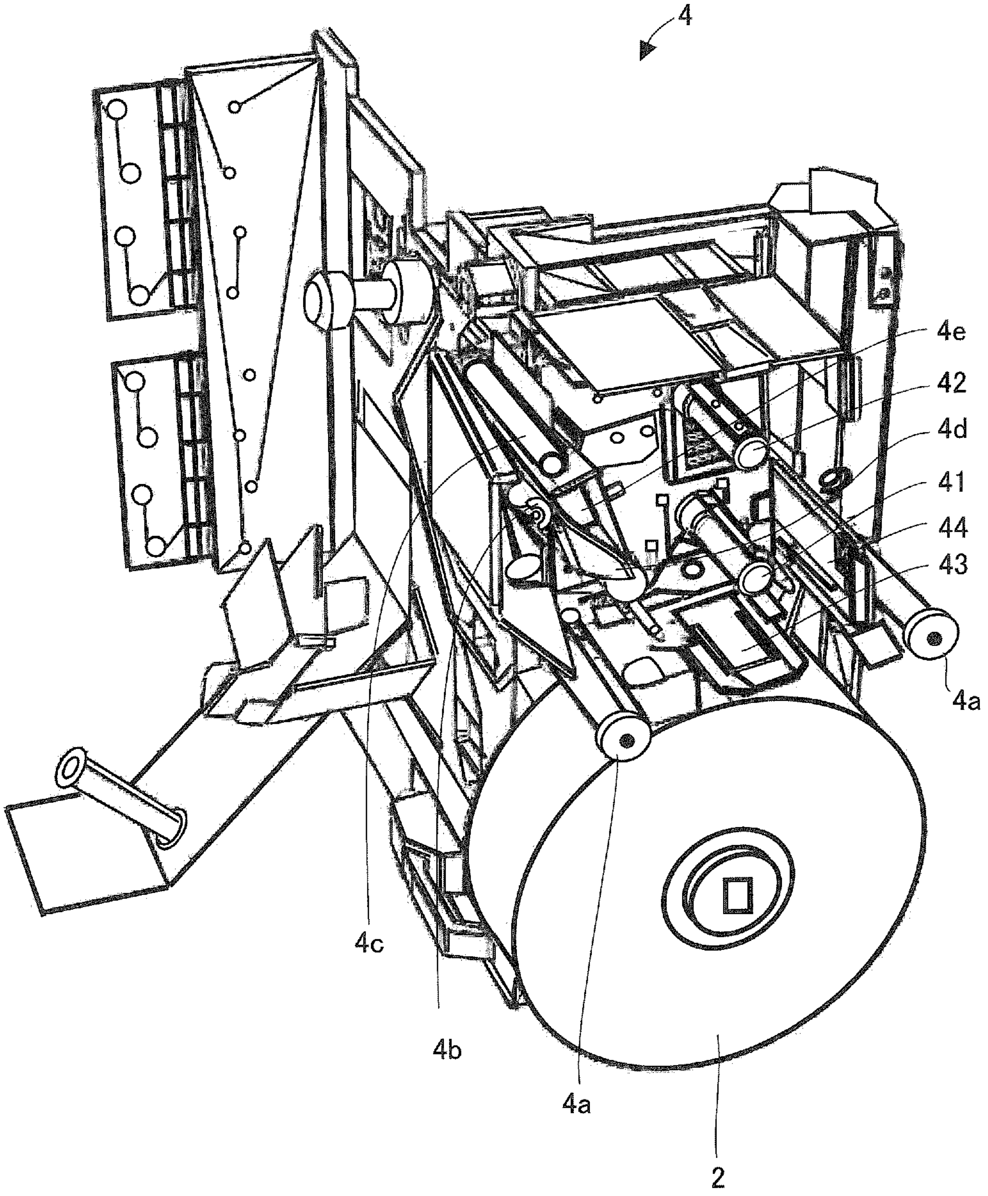
FIG. 4 is a perspective view showing a state where the ink ribbon cassette is removed in the printing and packaging unit shown in FIG. 2.

FIG. 3 is a perspective view showing a state where the cover unit **3*b*, etc., of the ink ribbon cassette 3 is removed in FIG. 2. FIG. 4 is a perspective view showing a state where the ink ribbon cassette 3 is removed in FIG. 2. A supply side support shaft 41 provided in the printing and packaging unit 4 supports a supply core 31 of the ink ribbon cassette 3, and rotates due to the rotation of the supply core 31. Further, a winding side support shaft 42 supports a winding core 32 of the ink ribbon cassette 3, and rotationally drives the winding core 32**.

As shown in FIG. 5, the winding side support shaft 42 is rotated by a winding motor 401 and a driving force transmission path 402. A torque limiter (torque transmission control unit) 403 is provided in the driving force transmission path 402. The torque limiter 403 cuts off the transmission of the driving force, whereby idling the winding motor when a load applied is more than a certain amount. Such a load occurs when the ink ribbon R which is pushed by the print head **4*e* is dragged by the running of the continuous sheet for packaging S, which leads the ink ribbon R to try to run at the same speed as the running speed of the continuous sheet for packaging S (a feed speed $V_2$). Furthermore, a disk portion 404*a* of a rotary encoder (rotation detection unit) 404 for detecting the rotation state of the winding side support shaft 42 is attached to the winding side support shaft 42. The rotation state of the disk portion 404*a* is detected by an optical sensor provided at a board 404*b* of a rotary encoder 404. The rotation of the winding side support shaft 42 is detected by the rotary encoder 404**.

Furthermore, a disk portion 411 of a rotary encoder 410 for detecting the rotation state of the supply side support shaft 41 is also attached to the supply side support shaft 41. The rotation state of the disk portion 411 is detected by an optical sensor provided at a board 412 of a rotary encoder 410. The rotation of the supply side support shaft 41 is detected by the rotary encoder 410.

Furthermore, a rotary encoder **4*f* is provided at the backup roller 4*b*** to detect its rotation state.

Two tabular antennas 43 and 44 are provided outside of a housing unit where the ink ribbon cassette 3 is installed. The two antennas 43 and 44 are arranged so that a radio wave transmission/reception surface faces a peripheral surface of the supply side support shaft 41 (faces a peripheral surface of the supply core 31 when the ink ribbon cassette 3 is installed), and that directions of the radio wave transmission/reception surface intersect (preferably positioned at a 90° angle).

Figure 6:
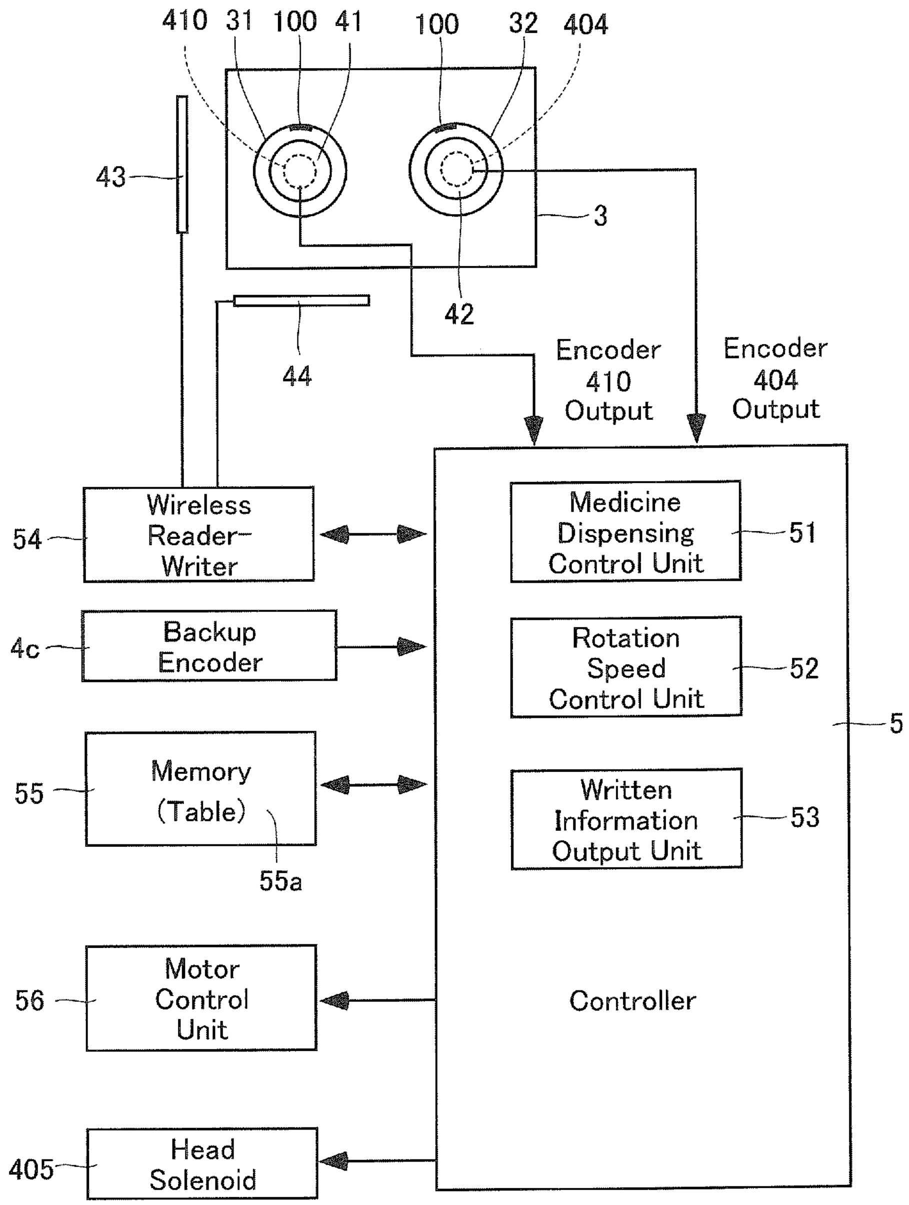
FIG. 6 is a block diagram showing a control system of the medicine packaging device of FIG. 1.

FIG. 6 is a block diagram showing the control system of the medicine packaging device 1 and the positional relationship between the supply core 31 and the antennas 43 and 44. The antennas 43 and 44 are connected to a wireless-communication-type reader-writer 51. This reader-writer 54 is controlled by a controller 5. The reader-writer 54 is configured to read information from an IC tag (e.g. RFID: Radio Frequency Identification) 100 as a wireless-communication-type recording medium provided at the supply core 31 inside the ribbon cassette 3, and also write information to the IC tag 100. Incidentally, in order to prevent illegal rewriting of the information, the information may be written to the IC tag 100 in either encrypted or compressed form.

The controller 5 is comprised of a microcomputer. The controller 5 not only operates as a medicine dispensing control unit 51, which controls the medicine dispensing unit 11, but also functions as a rotation speed control unit 52 for the winding side support shaft 42 and written information output unit 53.

The rotation speed control unit 52 controls the winding motor 401 so as to be $V_1 > V_2$, where a running speed of the ink ribbon R in the direction of winding is $V_1$, and a feed speed of the continuous sheet for packaging S is $V_2$, based on a usage length of the ink ribbon, which is information read from the IC tag 100. The winding motor 401 rotates a winding core 32 (the winding side support shaft 42) of the ink ribbon cassette 3. Although in this embodiment, the speed $V_1$ is set at a speed 115% of the speed $V_2$, it is also possible to set a speed value other than 115%. Here, in the ink ribbon cassette 3, there exists a certain relationship between the usage lengths of the ink ribbon R, the remaining roll diameter of the ink ribbon R remaining in the supply core 31, and the winding roll diameter of the ink ribbon R wound up to the supply core 32. This relationship will be explained later in detail.

Based on the above-mentioned certain relationship, by changing the rotation speed of the winding side support shaft 42 in accordance with the change of the usage length of the ink ribbon R, it is possible to rotate the winding motor 401 at a rotation speed by which the ink ribbon R runs at the speed $V_1$. Furthermore, because of the provision of the torque limiter 403, it is able to run the ink ribbon R at the feed speed of the continuous sheet for packaging S, whilst providing constant tension on the ink ribbon R when the head solenoid 405 is switched on (the state where the print head **4*e*** presses against the ink ribbon R).

The on/off threshold of the torque limiter 403 is set as follows. During the printing state where the ink ribbon R is dragged along by the running of the continuous sheet for packaging S and is running at the speed $V_2$, the running speed of the ink ribbon R is secured at $V_2$ even if the ink ribbon R is pulled at the speed $V_1$. Furthermore, during the state where printing is completed, the head solenoid 405 is switched off, and the ink ribbon R is no longer dragged along by the running the continuous sheet for packaging S, the winding of the ink ribbon R is triggered at the speed $V_1$. The winding motor 401 is stopped once the printing is completed.

Furthermore, because the ink ribbon R is used during the implementation of the medicine packaging, the rotation speed is recalculated according to the total usage length where the usage length is added to the length at the start of the medicine packaging. The usage length of the ink ribbon R during the implementation of the medicine packaging can be calculated according to the winding speed and the winding time of the ink ribbon R. Incidentally, information indicating that the usage length is zero is recorded on the IC tag 100 of the brand-new ink ribbon roll 30.

Furthermore, information such as the type of the ink ribbon R (color, black and white, etc.), the outer diameter and the radius of the core (given that the outer diameter and the radius of the supply core 31 and the winding core 32 are the same), and the thickness of ink ribbon R may be recorded on the IC tag 100. When such information is recorded, it is still operable if the outer diameter of the core and the thickness of ink ribbon R are different. The winding roll diameter (the radius in this instance), when the ink ribbon R is wound around the winding core 32, can be found through adding the radius of the winding core 32 and the thickness of the laminated layer of ink ribbon R (thickness×numbers wound of ink ribbon R).

Incidentally, because the winding core 32 does not have the antennas 43 and 44 on its side, and the outer diameter and the radius of the winding core 32 cannot be read through the IC tag 100, the outer diameter or the radius of the core recorded on the IC tag 100 of supply core 31 is used as the outer diameter or the radius of the core to calculate the winding roll diameter.

Figure 7:
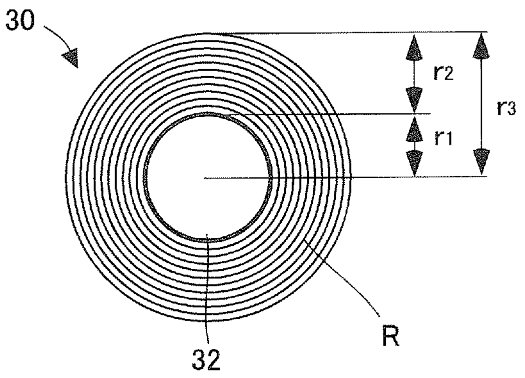
FIG. 7 is an explanatory view for explaining a roll diameter calculation of the ink ribbon of the medicine packaging device of FIG. 1.

The relationship between the running speed $V_1$ of the ink ribbon R in the direction of winding, and the feed speed $V_2$ of the continuous sheet for packaging S can be expressed as the following equation 1, using the sign of each component as shown in FIG. 7. Here, $r_1$ is the radius of the winding core 32, $r_2$ is the thickness of the laminated layer of the ink ribbon R, and $r_3$ is the winding roll diameter (the radius of the ink ribbon roll 30 of the winding side $(r_1+r_2)$). Furthermore, the rotation speed of the winding side support shaft 42 will be denoted as ω.

$$V_1=V_2\times 115\%=2\pi r_3\times\omega \qquad \text{[Equation 1]}$$

Furthermore, the change of the relationship between the usage length of the ink ribbon R, the thickness $r_2$ of the laminated layer, the rotation speed ω, and the winding length P per pulse of the rotary encoder 404 is shown in the chart below.

As understood from chart 1, the winding roll diameter $r_3$ changes according to the changes in usage length of the ink ribbon R. The speed $V_1$ can be generated by changing the rotation speed ω of the winding side support shaft 42 based on each level of the changes in diameters.

Furthermore, for example, using the added value of the number of output pulses of the rotary encoder 404 calculated at each level, it is possible to calculate the total number of the usage length (length wound) of the ink ribbon R, and to know the length of the ink ribbon R wound by the printing. From the length of the ink ribbon R used in the printing, the new usage length of the ink ribbon R can be calculated. This new usage length is written in the IC tag 100.

The added value of the number of output pulses (total number of pulse) from the rotary encoder 404 may be configured to be written in the IC tag 100 as the usage amount (amount wound) of the ink ribbon R. Here, because the number of output pulses from the rotary encoder 404 per rotation of the winding side support shaft 42 (the winding core 32) is already known, every time the number of output pulses per rotation is counted, the winding roll diameter $r_3$ of the ink ribbon roll 30 increases by the thickness of the ink ribbon R. Then, in regards to the total number of pulses of the rotary encoder 404, a certain range of pulses will corresponded to $P_1$, and the next range of pulses will correspond to $P_2$. Accordingly, based on this corresponding information, the usage amount (amount wound) of the ink ribbon R may be known from the number of total pulses written in the IC tag 100. Information regarding the usage amount (amount wound) P per each pulse on each level may be stored in a memory 55 of the medicine packaging device 1.

The speed $V_1$ may be generated without using the information regarding the usage amount (amount wound) P per each pulse on each level. That is, by dividing the total number of pulses of the rotary encoder 404 recorded on the IC tag 100 by the number of output pulses of the rotary encoder 404 per rotation, the total number of rotations of the winding core 32, which represents the usage amount (amount wound) of the ink ribbon R, is obtained. This total number of rotations corresponds to the paragraph numbers in Chart 1. By setting the rotation speed ω by adding the thickness of the ink ribbon R for the total number of rotations, the speed $V_1$ may be generated. That is, the speed $V_1$ may be generated from the total number of pulses of the rotary encoder 404, the radius $r_1$ of the winding core 32, and

CHART 1

| | Usage Length (Remaining Length) | $R_2$ of Winding Side (Supply Side) | Rotation Speed ω of Winding Side Support Shaft | Winding Length (SupplyLength) per 1 Pulse |
|---|---|---|---|---|
| (1) | $0\sim 2\pi r_1$ | 0 | $V_1/2\pi r_1$ | $P_0$ |
| (2) | $2\pi r_1\sim 2\pi(r_1$ + (Ribbon Thickness × 1)) | Ribbon Thickness × 1 | $V_1/2\pi(r_1$ + (Ribbon Thickness × 1)) | $P_1$ |
| (3) | $2\pi(r_1$ + (Ribbon Thickness × 1))~$2\pi(r_1$ + (Ribbon Thickness × 2)) | Ribbon Thickness × 2 | $V_1/2\pi(r_1$ + (Ribbon Thickness × 2)) | $P_2$ |
| (4) | $2\pi(r_1$ + (Ribbon Thickness × 2))~$2\pi(r_1$ + (Ribbon Thickness × 3)) | Ribbon Thickness × 3 | $V_1/2\pi(r_1$ + (Ribbon Thickness × 3)) | $P_3$ |
| . . . . . . | | . . . | . . . | . . . |
| | $2\pi(r_1$ + Ribbon Thickness × (a − 1))~$2\pi(r_1$ + Ribbon Thickness × a)) | Ribbon Thickness × 4 | $V_1/2\pi(r_1$ + (Ribbon Thickness × a)) | $P_a$ |

the thickness of the ink ribbon R. Information regarding the thickness of the ink ribbon R, as well as information regarding the radius $r_1$ of the winding core 32 may be stored in the memory 55 of the medicine packaging device 1.

Incidentally, other than relationships regarding the usage lengths, the relationship shown in Chart 1 above also corresponds to a relationship regarding the remaining length of the ink ribbon R, a thickness of the laminated layer of the supply core 31 side, and a supply length per pulse of the rotary encoder 410 provided at the supply side support shaft 41. The remaining length of the ink ribbon R may be calculated by subtracting the usage length from information showing the total length of a brand-new ink ribbon roll 30 (the diameter of the supply side roll, or the winding number a of the ribbon as shown at the lowest segment of Chart 1, may also be used). Information showing the total length is stored in a memory of the medicine packaging device 1, or in the IC tag 100. After obtaining the remaining length at the time of the initiation of the operation (refer to Chart 1) by subtracting the usage length stored in the IC tag 100 from the total length based on the information which shows the total length as mentioned above at the time of the initiation of the medicine packaging device 1, new remaining length may be calculated by decreasing the diameter of the supply roll by the thickness of the ink ribbon every time the ink ribbon R is used for the length per rotation of the supply side. The length per rotation of the supply side of the ink ribbon R is calculated from the diameter of the supply side roll (the initial diameter at the beginning, and the diameter at that time thereafter). The initial diameter, for example, may be obtained by obtaining from Chart 1 the thickness $r_2$ of the laminated layer which corresponds to the total length of the ink ribbon roll, and then adding the radius $r_1$ of the supply core to the obtained thickness $r_2$ of the laminated layer of the ink ribbon. When the diameter is known, the supply length per pulse at the supply side is known based on Chart 1. By multiplying the supply length per pulse by the number of pulse, the total supply length is calculated. In this way, when both the supply length and winding length are calculated, if both results roughly match, it can be determined that the ribbon running operation is normal. On the other hand, as will be later described, if the results obtained are overly different, it can be determined that the ribbon running operation is not normal, and a process to alert an abnormal winding may be performed.

Here, for example, when performing printing for 10 packages, the usage length at each start of the $1^{st}$ to $5^{th}$ packages corresponds to the level (1) of Chart 1, and the usage length at each start of the $6^{th}$ to $10^{th}$ packages corresponds to the level (2) of Chart 1. During the printing operation for the $1^{st}$ to $5^{th}$ packages, the number of output pulses from the rotary encoder 404 of the winding side is given as N1, and the number of output pulses from the rotary encoder 404 during the printing operation of the $6^{th}$ to $10^{th}$ package is given as N2. In this situation, the winding length (usage length) of the ink ribbon R is expressed as $P_0 \times N_1 + P_1 \times N_2$. Furthermore, as mentioned above, the supply length of the ink ribbon R during the printing operation can also be obtained based on the number of output pulses from the rotary encoder 410, which detects the rotation state of the supply side support shaft 41. The controller 5, then, determines whether the ratio (difference) of the winding length to the supply length shows an abnormal value or not. The medicine packaging device 1 issues a warning in the case where an abnormal value is shown. This abnormal value is triggered when the ink ribbon R is cut off, etc. In this embodiment, a warning is issued when the supply length is twice or more of the winding length. Incidentally, it may be configured to issue a warning even when the value is low, such as 1.3 times. However, there may be a possibility to issue warnings more than necessary if the value is set too low. Furthermore, in this embodiment, a warning is also issued when the supply length is 0.6 times or less of the winding length. This instance is triggered when winding control is performed based on incorrect usage lengths (remaining lengths) recorded on the IC tag 100.

A data table 55*a* in which the information about the rotation speed for the usage length of the ink ribbon R may be provided in the memory 55. In this instance, the rotation speed control unit 52 will provide the data table 55*a* with information showing the usage length of the ink ribbon R as a read out address, and then obtain information about the rotation speed outputted from the data table 55*a*. Next, because the ink ribbon R will be used during the implementation of the medicine packaging, the total usage length where this usage length is added to the length at the start of the medicine packaging will be sequentially provided to the data table 55*a* as a read out address, and new information about the rotation speed is obtained. Incidentally, it may be configured that the data table 55*a* is prepared for each type of the ink ribbon roll 30, and the type of the ink ribbon roll is read from the IC tag 100.

A Motor control unit 56 controls drive of the winding motor 401 under the control of the rotation speed control unit 52. That is to say that the rotation of the winding motor 401 is controlled so that the winding side support shaft 42 rotates at the rotation speed ω.

The written information output unit 53 outputs to the reader-writer 54 information about the total usage length of the ink ribbon. The total usage length has been changed due to the use of the ink ribbon R. This information is written into the IC tag 100 by the reader writer 54. For example, the rotation speed control unit 52 sequentially provides the written information output unit 53 with the total usage length where the usage length of the ink ribbon R which is used during the implementation of the medicine packaging is added to the length at the start of the medicine packaging. The written information output unit 53 supplies the reader-writer 54 with the total usage length. The reader-writer 54 sequentially writes the total usage length to the IC tag 100. From the next time, the medicine packaging device 1 may operate the printing process based on the usage length of the ink ribbon R obtained from the IC tag 100.

Figure 8:
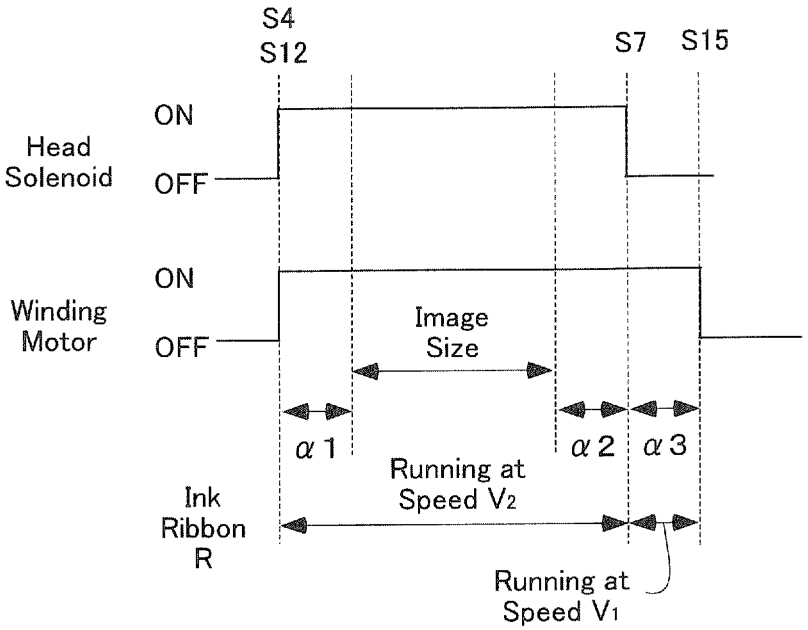
FIG. 8 is a timing chart showing an operation of a print head and a winding motor of the medicine packaging device of FIG. 1.

FIG. 8 shows a relationship between on/off of the head solenoid 405 (a state where the print head 4*e* moves towards the backup roller 4*b* side and presses against the ink ribbon R, as opposed to a state of not doing so), and on/off of the winding motor 401. The winding motor 401 is switched on simultaneously when the head solenoid 405 is switched on. Incidentally, S4, S12, S7 and S15 described in FIG. 8 correspond to the timing of steps S4, S12, S7, S15 described in the flowcharts of FIG. 9 and FIG. 10.

After a lapse of a first period α1 from powering on the head solenoid 405, printing data is transferred to the print head 4*e* and the print head 4*e* is heated. After powering the head solenoid 405 on, and running the continuous sheet for packaging S and the ink ribbon R for a moment, printing (heat transfer operation of the ink) is started. Here, if printing is initiated simultaneously with the powering on of the head solenoid 405, printing is initiated immediately after the print head 4*e* presses the ink ribbon R towards the back-up roller 4*b* side, which makes the printing quality (heat transfer quality of the ink) unstable. In this embodiment, provision of the first period α1 enables the stabilization of the print quality. The first period $\alpha 1$, for example, corresponds to a period of time where 7 mm of the ink ribbon R is fed. The first period $\alpha 1$ may be determined by counting the number of output pulses from the rotary encoder 4*f* provided in the back-up roller 4*b*, after the head solenoid 405 has been powered on.

During a period for an image size of one package after the first period $\alpha 1$, the transfer of the printing data is completed and the heating of the print head 4*e* is stopped. Here, in order to avoid an edge shifting of the continuous sheet for packaging S (a state where edges of the twofold continuous sheet for packaging S are not aligned evenly), in this embodiment, the head solenoid 405 is switched off every time after one package has been printed, and pressure against the continuous sheet for packaging S is released, thereby fixing the edge shifting.

However, if switching the head solenoid 405 off and separating the print head 4*e* immediately after the period for the image size (a period where the print head 4*e* is heated), contact states between the continuous sheet for packaging S and the ink ribbon R (for example, the period of contact) at the last segment to be printed and at the other segments to be printed in the image size become different. This causes non-uniformity in the printing quality (heat transfer quality of the ink).

Accordingly, after the end of the period for the image size, the head solenoid 405 is switched off after a lapse of a second period $\alpha 2$. This results in no discrepancies of the contact states between the continuous sheet for packaging S and the ink ribbon R at the last segment to be printed and at the other segments to be printed in the image size, which enables constant printing quality. The second period $\alpha 2$, for example, corresponds to the period when 4 mm of the ink ribbon R is fed. The second period $\alpha 2$ may be determined by counting the number of output pulses from the rotary encoder 4*f* after the end of the period for the image size. Furthermore, the number of output pulses from the rotary encoder 4*f* for the period for the image size is also known, the period for the image size can be determined to be ended when the number of pulses are counted.

Furthermore, insufficient winding of the ink ribbon R may occur when powering off the winding motor 401 immediately after switching off the head solenoid 405. For this reason, the winding motor 401 is powered off after a third period $\alpha 3$ has lapsed after switching off the head solenoid 405. That is, as the ink ribbon R is made to run for a moment after switching off the head solenoid 405, the insufficient winding of the ink ribbon R is prevented. Furthermore, because of the existence of the third period $\alpha 3$, the ink ribbon R may be separated appropriately from the continuous sheet for packing S. The third period $\alpha 3$, for example, is set at 40 milliseconds. The third period $\alpha 3$ is measured by starting a timer from when switching the head solenoid 405 off.

Figure 9:
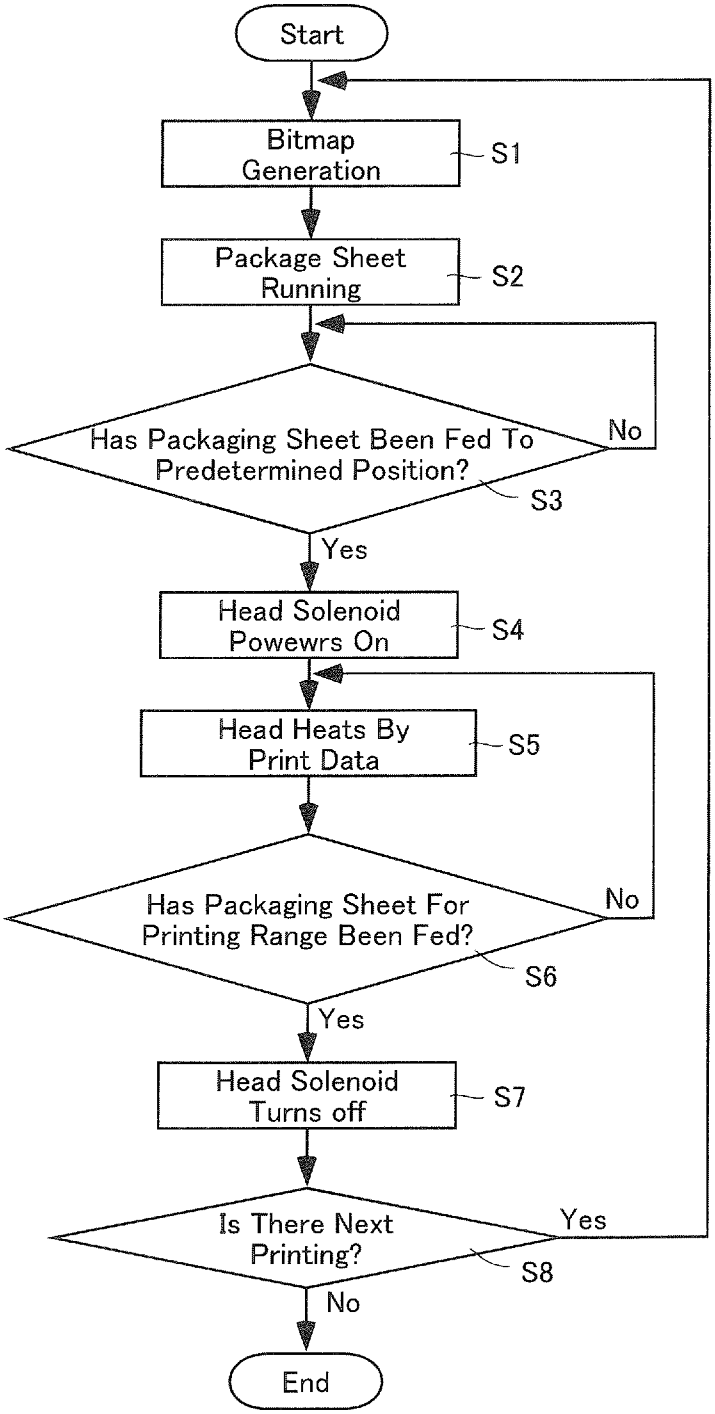
FIG. 9 is a flow chart showing an overview of a printing process according to one embodiment of the present invention.

FIG. 9 is a flowchart showing a summary of a printing process performed by the controller 5. The controller 5 performs a bitmapping process of the images where patient names, time and date to take the medicine, etc. are described (Step S1). Then, while the controller 5 runs the packaging sheet (the continuous sheet for packaging S) by means of the heater rollers 45*d* and 45*e*, the controller 5 initiates a process for heat-sealing the packaging sheet by one package (Step S2). The controller 5 determines whether the packaging sheet has been fed to a predetermined position, in other words, whether a front position of a printing range of the packaging sheet (the first period $\alpha 1$+the second period $\alpha 2$+the third period $\alpha 3$) has reached a position of the print head 4*e*, based on an operation of the heater rollers 45*d* and 45*e*, for example (Step 3). When it is determined that the packaging sheet has been fed to the front position, the head solenoid 405 is switched on (Step S4). When the head solenoid 405 is switched on, the ink ribbon R is pressed against the packaging sheet by the print head 4*e*, causing the ink ribbon R to run at the speed $V_2$.

Furthermore, the controller 5 transmits to the print head 4*e* the printing data obtained by the bitmapping, and heats the print head 4*e* (Step S5). In this embodiment, the print head 4*e* is heated after waiting for lapse of the first period $\alpha 1$ as described above. Then, the controller 5 determines whether an amount of packaging sheet corresponding to the printing range has been fed (Step S6). If it is determined that the amount of packaging sheet corresponding to the printing range has not been fed yet, it reverts to step 5. If it is determined that the amount of packaging sheet corresponding to the printing range has been fed, the head solenoid 405 is switched off (Step S7). The controller 5 reverts back to Step S1 if there is a next printing.

Figure 10:
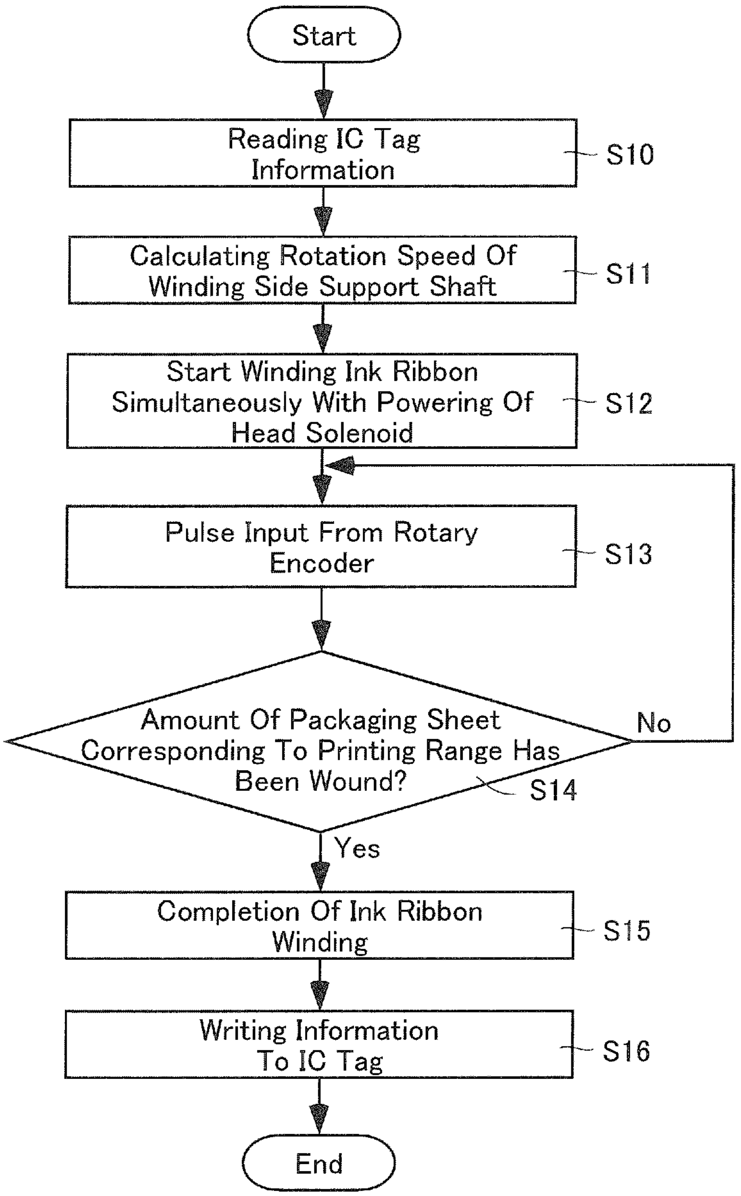
FIG. 10 is a flowchart showing an overview of an ink ribbon running process according to one embodiment of the present invention.

FIG. 10 is a flowchart showing an overview of a running control of the ink ribbon R performed during the printing process. The controller 5 reads information showing the usage length of the ink ribbon R from the IC tag 100 (Step S10). Based on this information, the rotation speed of the winding side support shaft 42 is calculated to obtain the speed V1 (Step S11). Then, at the same time as the head solenoid 405 is switched on at the printing process in FIG. 9, the controller 5 rotates the winding side support shaft 42 at a rotation speed ω which was calculated in accordance with the above, and winds the ink ribbon R (Step S12).

The controller 5 counts the number of output pulses from the rotary encoder 4*f* at the backup roller 4*b* (Step S13). After the controller 5 has determined that the amount of packaging sheet corresponding to the printing range has been wound, the controller 5 determines whether the third period $\alpha 3$ has lapsed (Step S14). If the determination of Step 14 is No, the above determination process is continued. If the determination of Step 14 is Yes, the winding motor 401 is powered off, the drive of the winding side support shaft 42 is stopped, whereby the winding of the ink ribbon R is completed (step S15). Then, the controller 5 writes to the IC tag 100 usage length which is newly calculated based on length of the ink ribbon R which is newly wound (Step S16).

In this way, the information showing the usage length of the ink ribbon R is read from the IC tag 100 installed at the supply core 31 of the ink ribbon roll 30 which is detachably installed to the ink ribbon cassette 3. Based on this information, the winding motor 401 is controlled so as to provide the winding side support shaft 42 with the rotation speed ω for obtaining the speed V1, which is faster than the speed V2. From this, the ink ribbon R may be wound without slack without the use of a tension bar. Accordingly, this removes the need to install the tension bar in the medicine packaging device 1. A task to pass the ink ribbon R over the tension bar becomes unnecessary. Furthermore, because the ink ribbon R may be wound at a constant speed as opposed to in an intermittent fashion, the printing quality is thus improved.

Furthermore, even if the winding motor 401 is controlled to generate the rotation speed ω on the winding side support shaft, because of the provision of the torque limiter 403, the ink ribbon R can be made to run at the feed speed V2 of the continuous sheet for packaging S, while the applying of excessive force on the ink ribbon R during printing is prevented.

Furthermore, because the usage length is stored on the IC tag 100 of the supply core 31 which is unified with the ink ribbon R, even if it is replaced to an ink ribbon cassette 3 which is partly used, the feed speed of the ink ribbon R may be appropriately controlled according to the usage length stored in the IC tag 100 in the supply core 3 of that ink ribbon 3 which is partly used. Incidentally, instead of the usage length of the ink ribbon R, information showing remaining length of the ink ribbon R is recorded onto the IC tag 100. In this case, based on this information about the remaining length, the ink ribbon R may be wound at a constant speed. Furthermore, information about the diameter of the roll of the ink ribbon R may be recorded on the IC tag 100 as the usage amount or the remaining amount. And even further, information about the number of winds (laps) of the ink ribbon R may be recorded onto the IC tag 100 as the usage amount or the remaining amount.

Furthermore, regarding the relation between the speed V1 and the feed speed V2 of the continuous sheet for packaging S, even if the speeds are set at a rate of V1>V2, if the difference between V1 and V2 is too small, the speed V1 may result in a slower speed than of the feeding speed V2 in the actual speed because transporting velocity of the continuous sheet for packaging S of each medicine packaging device differs by some amount, the rotation speed of the winding side support shaft 42 fluctuates to a certain degree, etc. If such an instance may occur, the slacking of the ink ribbon R will result. For this reason, the speeds should be set at, for example, $V_1>V_2\times105\%$.

On the other hand, the ink ribbon R runs at the feeding speed $V_2$ prior to the initiation of the third period α3 shown in FIG. 8, while the ink ribbon R runs at the speed $V_1$ after the initiation of the third period α3. If the difference between the speed $V_1$ and the feed speed $V_2$ is set to be too large, the time between the heat transfer from the ink of the ink ribbon R onto the continuous sheet for packaging S by the print head 4*e*, and the separation of the ink ribbon R becomes too short. In such event, the ink may not be transferred onto the continuous sheet for packaging S sufficiently, resulting in a faded print. Furthermore, the ink ribbon R is actually wound up at the speed $V_1$ during the third period α3, which results in an unused area of the ink ribbon R corresponding to the third period α3. If the speed $V_1$ is too fast, the unused area will be longer. Therefore, it is desirable to set the speeds at $V_1<V_2\times150\%$.

By the way, the facts that the transporting velocity of the continuous sheet for packaging S of each medicine packaging device differs by some amount, and that the rotation speed of the winding side support shaft 42 fluctuates, are resolvable by preparing the medicine packaging device 1 with higher precision. Therefore, in regards to the relation between the speed V1 and the feed speed V2 of the continuous sheet for packaging S, the speeds may be controlled to be set at V1=V2. Alternatively, in regards to the relation between the speed V1 and the feed speed V2 of the continuous sheet for packaging S, V1 may be controlled to approximate the speed V2 (for example, V1=V2×99%). In such a case, a configuration not including the torque limiter (torque transmission control unit) 403 in the driving force transmission path 402 may be adopted.

Figure 11:
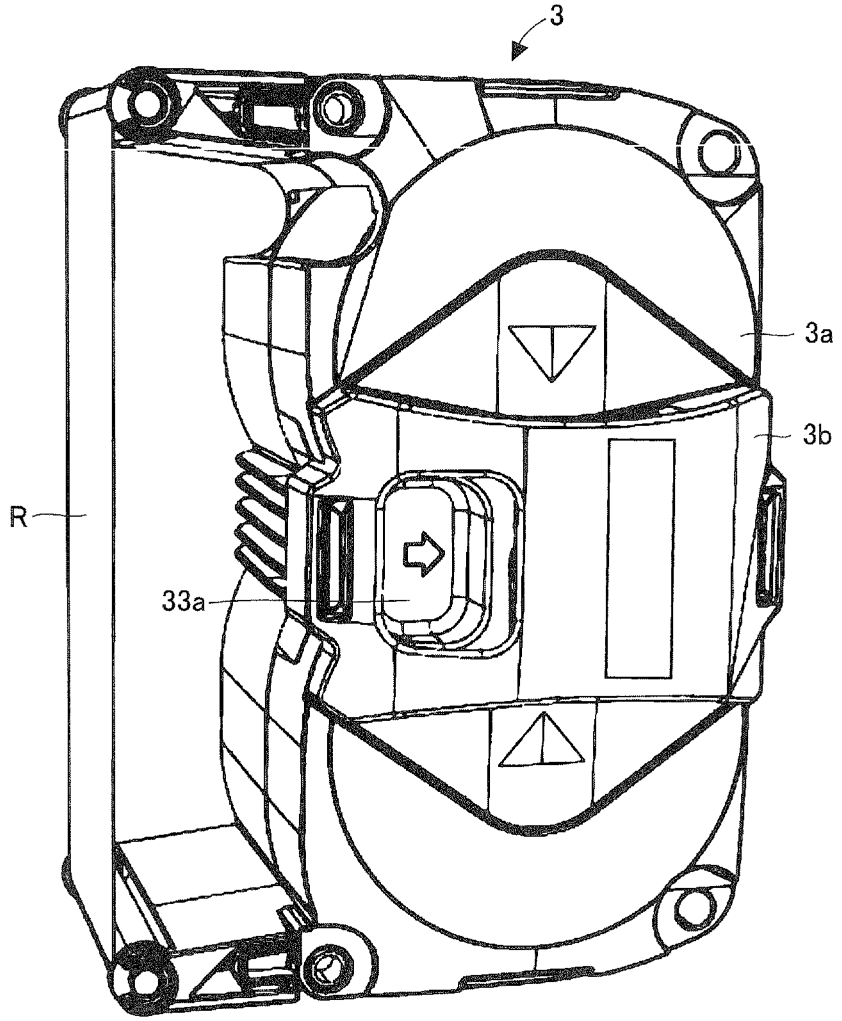
FIG. 11 is a perspective view showing the ink ribbon cassette according to one embodiment of the present invention.
Figure 12:
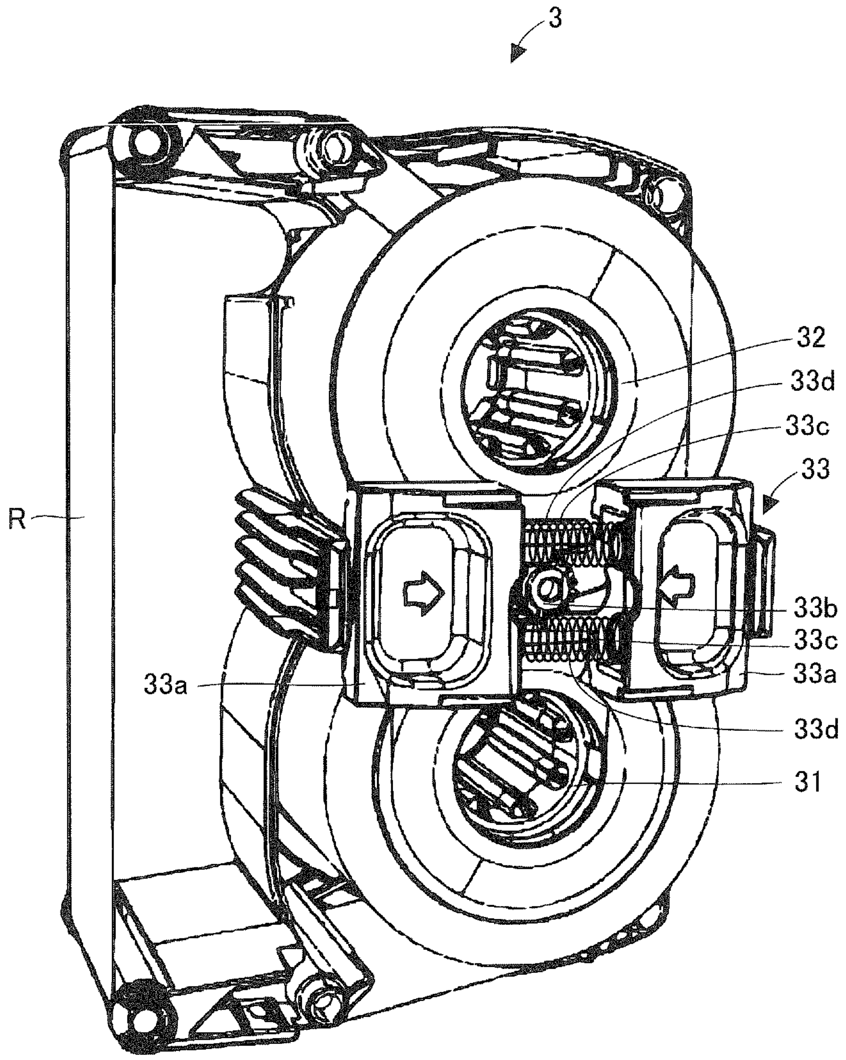
FIG. 12 is a perspective view showing a state where a lid and a cover unit are removed in the ink ribbon cassette shown in FIG. 9, thereby exposing a lid lock unit.
Figure 15:
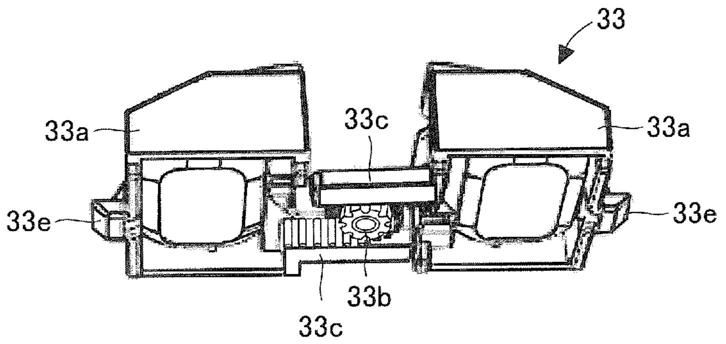
FIG. 15 is a perspective view showing the lid lock unit of the ink ribbon cassette shown in FIG. 9.

FIG. 11 is a perspective view showing the ink ribbon cassette 3. FIG. 12 is a perspective view showing a state where a lid 3*a* and the cover unit 3*b* that cover an accommodating space of the ink ribbon cassette 3 are removed, while the lid lock unit 33 provided at the lid 3*a* is not removed, from the ink ribbon cassette 3 in FIG. 11. FIG. 15 is a perspective view of a lick lock unit 33 viewed from the lower side.

The lid lock unit 33 includes a pair of lock operation units 33*a* and 33*a* which are movably provided. Each of the lock operation units 33*a* is guided by a guide rail formed on the lid 3*a*, and can be moved in a direction towards and away from one another. Furthermore, a gear 33*b* is arranged between the pair of lock operation units 33*a*. This gear 33*b* is supported by a shaft provided at the lid 3*a*. Rack units 33*c* of the pair of the lock operating units 33*a* are facing one another and meshed at the gear 33*b* so that the rack units 33*c* sandwich the gear 33*b* from both sides. Furthermore, two coil springs 33*d* are arranged in its compressed state between the pair of the lock operating units 33*a*.

When the pair of the lock operation units 33*a* approach to each other opposing biasing force of the coil spring 33*d*, because protrusions 33*e* formed at each of the lock operation units 33*a* disengage from locking holes of a body of the ink ribbon cassette 3, the lid 3*a* can be detached.

However, because the cover unit 3*b*, as shown in FIG. 12, is provided on the lid lock unit 33 to expose only one of the pair of the lock operation units 33*a*, a user cannot put a finger on both of the pair of the lock operation units 33*a*. Accordingly, when the user tries to detach the ink ribbon cassette 3 from the medicine packaging device 1, the user cannot pick both of the pair of the lock operation units 33*a* at a time, thereby reducing the chance of just the lid 3*a* of the ink ribbon cassette 3 to come off. On the other hand, when the user tries to remove the lid 3*a* of the ink ribbon cassette 3*a*, the lid 3*a* may be detached through securely operating one of the lock operation units 33*a*.

Figure 13:
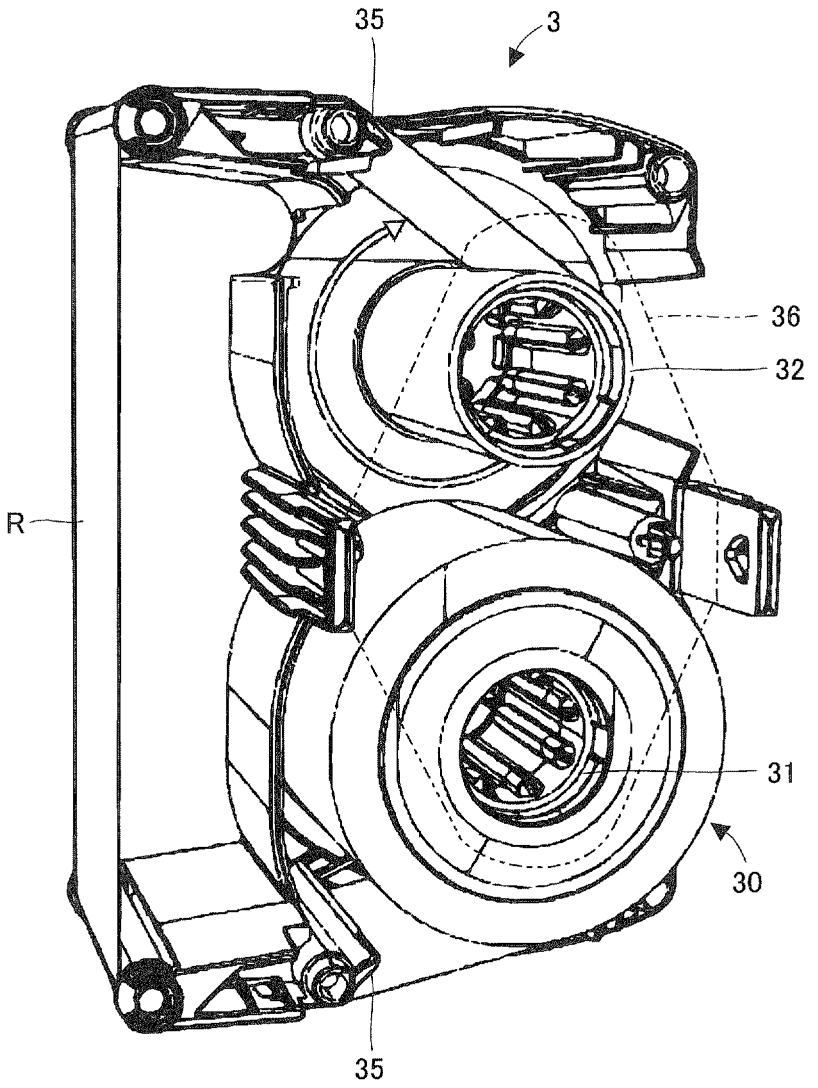
FIG. 13 is a perspective view showing a state where the ink ribbon roll is exposed in the ink ribbon cassette shown in FIG. 9.
Figure 14:
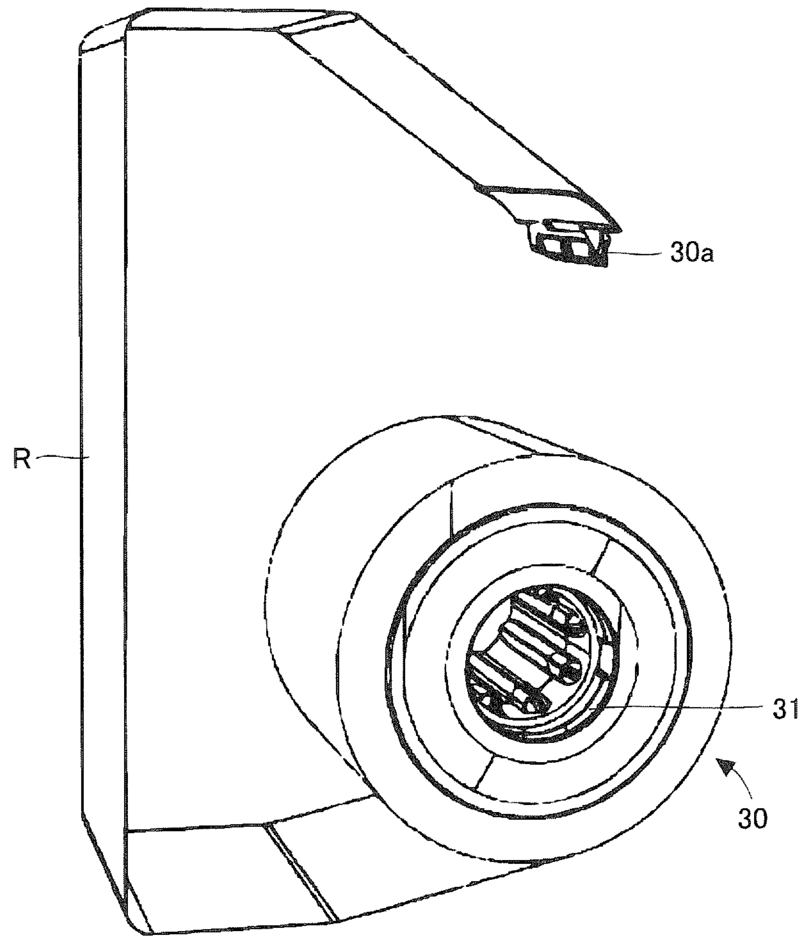
FIG. 14 is a perspective view showing the ink ribbon roll according to one embodiment of the present invention.

FIG. 13 is a perspective view showing the accommodating space within the ink ribbon cassette 3 as well as the ink ribbon roll 30 installed at the accommodating space. FIG. 14 is a perspective view showing the ink ribbon roll 30. The ink ribbon roll 30 is composed of the supply core 31, the ink ribbon roll R, and a hook unit 30*a* provided at both ends of the ink ribbon R. The ink ribbon roll 30 is supplied as consumable goods. The hook unit 30*a* is detachably engaged to the supply core 31 and the winding core 32. When the ink ribbon R of the ink ribbon roll 30 installed in the medicine packaging device 1 is used up, the hook 30*a* of this depleted ink ribbon R is detached from the supply core 31. The depleted ink ribbon R is discarded with the winding core 32. On the other hand, the supply core 31 which the hook unit 30*a* is detached from is transferred to the winding side support shaft 42, where it is reused as the winding core 32. A user attaches the supply core 31 of the new ink ribbon roll 30 to the supply side support shaft 41, and locks the hook unit 30*a* at the tip of ink ribbon R will to the reused winding core 32.

In this way, with a configuration where the ink ribbon R has at its both ends the hook unit 30*a* which can be detachably engaged with the supply core 31, the supply core 31 which has depleted the ink ribbon R may be reused as the winding core 32. As the hook unit 30*a* of the newly installed ink ribbon roll 30 may be engaged with the reused winding core (the supply core which has depleted the ink ribbon), it is possible to reduce the number of cores to be discarded.

Furthermore, as shown in FIG. 13 above, a conductive part 35 which is in contact with a surface of the ink ribbon R is provided in the ink ribbon cassette 3. The conductive part 35 is made of metal, etc. In addition, a ground part is provided in the medicine packaging device 1. The ground part comes into contact with the conductive part 35 when the ink ribbon cassette 3 is installed into the medicine packaging device 1. Because of this, any static electricity generated in the ink ribbon R is eliminated in the medicine packaging device 1 via the conductive part 35 and the ground part.

Furthermore, the ink ribbon cassette 3 may be equipped with a guide component 36. This guide component 36 is positioned to extend over both sides of the supply core 31 and the winding core 32 which the ink ribbon R is passed over. The guide component 36 prevents the meandering of the ink ribbon R when it is running. The guide component 36 may be provided at one side of the supply core 31 and the winding core 32. Furthermore, by providing multiple positions for the guide component 36 to be installed (position in the width direction of ink ribbon R), the installation position of the guide component 36 may be changed according to the width of ink ribbon R. With this, the meandering of the ink ribbons R of various widths may be prevented.

Figure 16:
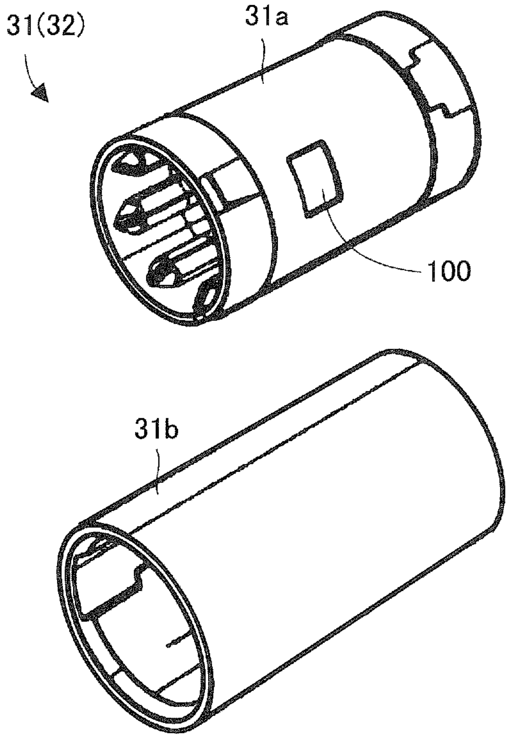
FIG. 16 is a perspective view showing an inner cylinder and an outer cylinder of the supply core in the ink ribbon roll shown in FIG. 12.

FIG. 16 is a perspective view showing an inner tube 31*a* and an outer tube 31*b* of the supply core 31. The supply core 31 has a configuration where the inner tube 31*a* is press-fitted into (or engaged with) the outer tube 31*b*. Regarding this press fit state, a gap is formed between an outer surface of the inner tube 31*a* and an inner surface of the outer tube 31*b*. The IC tag 100 is provided within the gap. Although in this embodiment, the IC tag 100 is adhered on the outer surface of the inner tube 31*a*, the IC tag 100 may also be adhered to the inner surface of the outer tube 31*b*. With this configuration, even if a defect of the IC tag 100 has been detected after assembly of the supply core 31, the supply core 100 may be disassembled into 31*a* and the outer tube 31*b*, the IC tag 100 having the defect is removed, and a IC tag is adhered, thereby reassembling the supply core 31. Furthermore, because the IC tag 100 is not exposed on the surface of the supply core 31, there is an advantage that the IC tag 100 is difficult to damage.

Incidentally, a light reflection area is formed in a region of a predetermined length at an posterior end of the ink ribbon R which is wound around the ink ribbon roll 30. When the medicine packaging device 1 detects the light reflecting area by means of a light sensor, the end of the ink ribbon R is determined. Because the light reflecting area is composed of a non-metallic reflective tape (a white resin tape, etc.), the attenuation of a radio waves sent and received between the reader-writer 54 and the IC tag 100 may be suppressed as compared to using metal for the light reflecting area.

Furthermore, all or one segment of the supply side support shaft 41, which supports and rotates the supply core 31, is made from a non-metallic material (wood or resin), which has low-absorption properties of radio waves. Because of this configuration of utilizing non-metallic materials, the attenuation of radio waves sent and received between the reader-writer 54 and the IC tag 100 may be suppressed as compared to using metal for the supply side support shaft 41.

Furthermore, by increasing the area of an antenna of IC tag 100 by extending length of it in an axial direction of the supply core 31, it is possible to extend a range of communication. Furthermore, in a case of employing the IC tag 100 which has an antenna with a size that is about an entire circumference of the inner tube 31*a* of the supply core 31, it is also possible to adopt a configuration in which only one antenna of the antennas 43 and 44 is placed. Furthermore, when providing a loop-shaped antenna along an outer circumference of the inner tube 31*a*, it is also possible to adopt a configuration in which only one antenna facing the previously mentioned loop-shaped antenna is placed.

Figure 18:
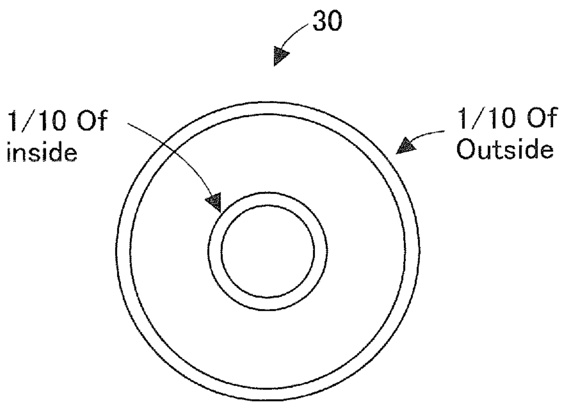
FIG. 18 is an explanatory view showing 1/10 of an inside and 1/10 of an outside of the ink ribbon roll shown in FIG. 12.

Furthermore, in a storage area of the IC tag 100, the usage length of the ink ribbon R is stored. A plurality of the storage areas for the usage length may be provided. In this embodiment, ten storage areas are provided on the IC tag 100, and a locking process (deactivation process of rewriting) may be performed under the control of the controller 5 on the storage areas. One storage area corresponds to 1/10 of the total number of pulses from the rotary encoder 404 of the winding side support shaft 42 (1/10 of the total number of laps 'a' of the ink ribbon roll 30), when one roll of the ink ribbon roll 30 is used. Incidentally, as shown in FIG. 18, the ribbon length for 1/10 of the inside and 1/10 of the outside of the ink ribbon roll 30 will be different.

In the above case, while recording information to a first storage area by calculating the usage length for within 1/10 of the total number of pulses from the rotary encoder 404, the medicine packaging device 1 rewrites the usage length recorded on the first storage area using the newly calculated usage length. Then, when it calculates the usage length surpassing 1/10 of the total number of pulses from the rotary encoder 404, the medicine packaging device 1 performs a process to lock the first storage area, and record the usage length on the second storage area. Similarly thereafter, as the usage length increases over the capacity of the current storage area, that storage area is locked, and the usage length is continued to be recorded on the next storage area.

In other words, a plurality of storage areas that record the usage length are provided on the IC tag 100. The storage areas are locked by stages according to an increase of the usage length, and recording is configured to be done on a new storage area. Because of this, for example, at a stage when the usage length is being recorded on the second storage area, even if a newly calculated usage length corresponds to a value to be recorded on the first storage area, such a value will not be recorded on the second storage area. Moreover, because the first storage area is locked, it will also not be recorded on the first storage area. In such a situation, the medicine packaging device 1 issues a warning.

Here, if the amount of printing is tiny even if a printing process is performed on the continuous sheet for packaging S (for example, if the actual printing area is tiny in the bitmap printing data), by the reason that it is a waste of ink ribbon R, a user may rewind the ink ribbon R by hand. However, by rewinding an already used segment of the ink ribbon to perform printing, proper printing may not be performed at a point where an ink is already depleted (for example, the letter "8" may come out as a "3" due to a blur).

Here, after detecting that the ink ribbon cassette 3 (including those that have been already used halfway) is installed, the medicine packaging device 1 rotates the winding side support shaft 42, for example, three times. Based on a rotation amount Z of the supply side support shaft 41 during the three rotations, the usage length of the ink ribbon roll 30 of the ink ribbon cassette 3 is calculated. The relationship between the rotation amounts of the supply side support shaft 41 and the winding side support shaft 42 is as follows:

$$2\pi\times\text{radius of winding side roll}\times 3\text{ rotations}=2\pi\times\text{radius of supply side roll}\times\text{rotation amount } Z \quad \text{[Equation 2]}$$

Because the rotation amount Z can be determined from the number of pulses from the rotary encoder 410 of the supply side, a ratio of diameters of a winding roll side and a supply roll side may be calculated. Then, by storing the data table with the ratio of diameters and the usage length already stored to a memory 55, for example, of the medicine packaging device 1, it is possible to derive the usage length based on the data table and the calculated ratio of diameters. If the derived usage length and the usage length stored in the IC tag 100 differ more than a predetermined amount, the medicine packaging device 1 adopts the derived usage length. The medicine packaging device 1 rewrites the usage length recorded in the IC tag 100 by using the derived value.

In other words, the medicine packaging device 1 performs: a process for determining the usage length of the ink ribbon roll 30 by rotating the winding core 32 of the installed ink ribbon cassette 3 by a predetermined number; a process for reading the usage length of the ink ribbon roll 30 from the IC tag 100 in the ink ribbon cassette 3; a process for comparing the two usage lengths; and a process for either using the usage length recorded in the IC tag 100, or rewriting the usage length recorded in the IC tag 100, based on the results of the comparison.

Here, even if the usage length is changed so as to reduce the length, if the changed value of the usage length is not out of the range of the corresponding storage area, the medicine packaging device 1 this changed usage length overwrites the changed value. However, if this value of the usage length is a value not in the range of the corresponding storage area, as the previous storage area is locked, the changed usage length cannot be recorded. Accordingly, if the ink ribbon R is rewound excessively, the changed (decreased) usage length due to rewinding the ink ribbon cannot be recorded on the IC tag 100. In such an instance where the medicine packaging device 1 cannot implement a recording process, a warning process is performed to indicate that the ink ribbon cassette 3 is improper. Through this mechanism, such situations where proper printing cannot be performed may be achieved.

Incidentally, in the above example, the medicine packaging device 1 performs the calculation of the usage length from the rotation amount Z when it detects the installation of the ink ribbon cassette 3. However, a timing of implementing this calculation procedure is not limited to a timing when the ink ribbon cassette 3 is installed.

Furthermore, the medicine packaging device 1 is configured to perform communication with the IC tag 100 under a condition that it detects proper installation of the ink ribbon cassette 3 with a sensor.

Furthermore, in the above example, the medicine packaging device 1 is configured to read information during the running control of the ink ribbon R from the IC tag 100 provided in the supply core 31, as well as write the information to the IC tag 100. However, the medicine packaging device 1 is not limited to this configuration. The medicine packaging device 1 may also read information during the running control of the ink ribbon R from the IC tag 100 provided in the winding core 32, as well as write the information to the IC tag 100.

Although the embodiments of the present invention have been explained above in reference to the drawings, the present invention is not limited to the embodiments shown in the drawings. In regards to the embodiments as shown in the drawings, it is possible to implement various modifications and changes within the same scope of the present invention, or within the scope of its equivalents.

What is claimed is:

1. A medicine packaging device printing on a continuous sheet for packaging by bringing an ink ribbon and the continuous sheet for packaging into contact with one another using a print head, as well as packaging medicine by one package by using the continuous sheet for packaging, the medicine packaging device comprising:

an ink ribbon roll that has the ink ribbon wound around a supply core having a structure where an inner tube is inserted into an outer tube, whereby forming a gap between the inner tube and the outer tube, the ink ribbon roll further having a recording medium provided in the gap;

an ink ribbon cassette to which the ink ribbon roll is detachably installed;

a reader-writer that reads information from the recording medium installed at the supply core of the ink ribbon roll from a position outside of the ink ribbon cassette as well as writes information to the recording medium; and an information output unit that outputs information showing the usage amount or the remaining amount of the ink ribbon which have been changed due to the use of the ink ribbon, to the reader-writer as information to be written on the recording medium, wherein the recording medium of the ink ribbon roll has a plurality of storage areas each corresponding to each of the usage amounts of the ink ribbon roll, and a rewriting process of each storage area is deactivated as needed, and the actual usage amount of the ink ribbon roll is compared with the usage amount recorded on the recording medium, and, in a case where the two usage amounts are different, the usage amount recorded on the recording medium is rewritten so as to conform to the actual usage amount.

* * * * *